US010091535B2

(12) United States Patent
Thompson et al.

(10) Patent No.: US 10,091,535 B2
(45) Date of Patent: Oct. 2, 2018

(54) SYSTEM AND METHOD FOR SHARING TELEVISION PROGRAMMING INFORMATION USING UNIVERSAL IDENTIFIER

(75) Inventors: Matthew J. Thompson, Torrance, CA (US); Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1101 days.

(21) Appl. No.: 12/947,518

(22) Filed: Nov. 16, 2010

(65) Prior Publication Data
US 2017/0085919 A1  Mar. 23, 2017

(51) Int. Cl.
*G06F 3/00* (2006.01)
*G06F 13/00* (2006.01)
*H04N 5/445* (2011.01)
*H04N 7/173* (2011.01)
*H04N 21/222* (2011.01)
*H04N 21/258* (2011.01)
*H04N 21/482* (2011.01)

(52) U.S. Cl.
CPC ..... *H04N 21/222* (2013.01); *H04N 21/25825* (2013.01); *H04N 21/4826* (2013.01)

(58) Field of Classification Search
CPC ........... H04N 21/222; H04N 21/25825; H04N 21/4826
USPC ................................ 725/37, 38, 39, 40, 112
See application file for complete search history.

(56) References Cited

U.S. PATENT DOCUMENTS

| | | | |
|---|---|---|---|
| 2003/0101232 A1* | 5/2003 | Ullman et al. | 709/217 |
| 2003/0233451 A1* | 12/2003 | Ludvig | H04N 21/2221 |
| | | | 709/225 |
| 2006/0117365 A1* | 6/2006 | Ueda et al. | 725/112 |
| 2006/0221173 A1* | 10/2006 | Duncan | 348/14.02 |
| 2006/0271963 A1* | 11/2006 | Mangu et al. | 725/60 |
| 2008/0212941 A1* | 9/2008 | Lillethun et al. | 386/124 |
| 2008/0276279 A1* | 11/2008 | Gossweiler et al. | 725/46 |
| 2009/0204481 A1* | 8/2009 | Navar et al. | 705/10 |
| 2009/0313657 A1* | 12/2009 | Britt et al. | 725/51 |
| 2010/0070899 A1 | 3/2010 | Hunt et al. | |
| 2011/0080940 A1* | 4/2011 | Bocharov et al. | 375/240.01 |

(Continued)

FOREIGN PATENT DOCUMENTS

| | | | |
|---|---|---|---|
| EP | 1694070 A1 | 8/2006 | |
| EP | 1708467 A1 | 10/2006 | |

(Continued)

OTHER PUBLICATIONS

International Search Report and Written Opinion dated Mar. 30, 2012 in International Application No. PCT/US2011/060478 filed Nov. 11, 2011 by Matthew J. Thompson.

*Primary Examiner* — Kyu Chae
(74) *Attorney, Agent, or Firm* — Harness, Dickey & Pierce, P.L.C.

(57) ABSTRACT

A system and method for sharing television data includes a first device and an encoded content identifier module in communication with the first device generating an encoded content identifier for a content and communicating the encoded content identifier to a first device through a network. The first device includes a user interface for selecting the content identifier. The first device performs a function in response to a type of device, the encoded content identifier and selecting the content identifier.

79 Claims, 31 Drawing Sheets

(56) References Cited

U.S. PATENT DOCUMENTS

2011/0083069 A1* 4/2011 Paul et al. .................... 715/234
2011/0124319 A1* 5/2011 Fu .............................. 455/414.1

FOREIGN PATENT DOCUMENTS

EP           2129121 A1    12/2009
WO     2005/013617 A1     2/2005

* cited by examiner

SYSTEM AND METHOD FOR SHARING TELEVISION PROGRAMMING INFORMATION USING UNIVERSAL IDENTIFIER

TECHNICAL FIELD

The present disclosure relates to a content and data processing and delivery system and, more specifically, a system and method for sharing content and sharing access to content.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

Satellite television broadcast systems typically use several satellites. Each satellite has several transponders that receive signals from the ground and broadcast the signals to users. Each transponder is capable of providing a certain amount of content therethrough. Satellites may be used for delivering linear content, which is content broadcast according to regularly scheduled times. Network programming is an example of linear programming. The on-demand system provided by DIRECTV® uses broadband capacity as well as satellite capacity to communicate content to users.

Social networking sites allow various users to quickly communicate with each other. Communications may include general messages that are posted and may be viewed by a variety of people. Likes and dislikes of the various users may also be communicated. Television programming and movies may also be commented on by various users. Providing easy access to various content is important to content providers.

SUMMARY

The present disclosure provides a system and method for providing an encoded content identifier such as an encoded content identifier link that may be easily shared between users so that content may be quickly accessed, recorded or viewed.

In one aspect of the disclosure, a method includes generating an encoded content identifier for a content, communicating the encoded content identifier to a first device through a network, selecting the content identifier at the first device and in response to a type of device, the encoded content identifier and selecting the content identifier, performing a function at the first device.

In another aspect of the disclosure, a system for sharing television data includes a first device and an encoded content identifier module in communication with the first device generating an encoded content identifier for a content and communicating the encoded content identifier to a first device through a network. The first device includes a user interface for selecting the content identifier. The first device performs a function in response to a type of device, the encoded content identifier and selecting the content identifier.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
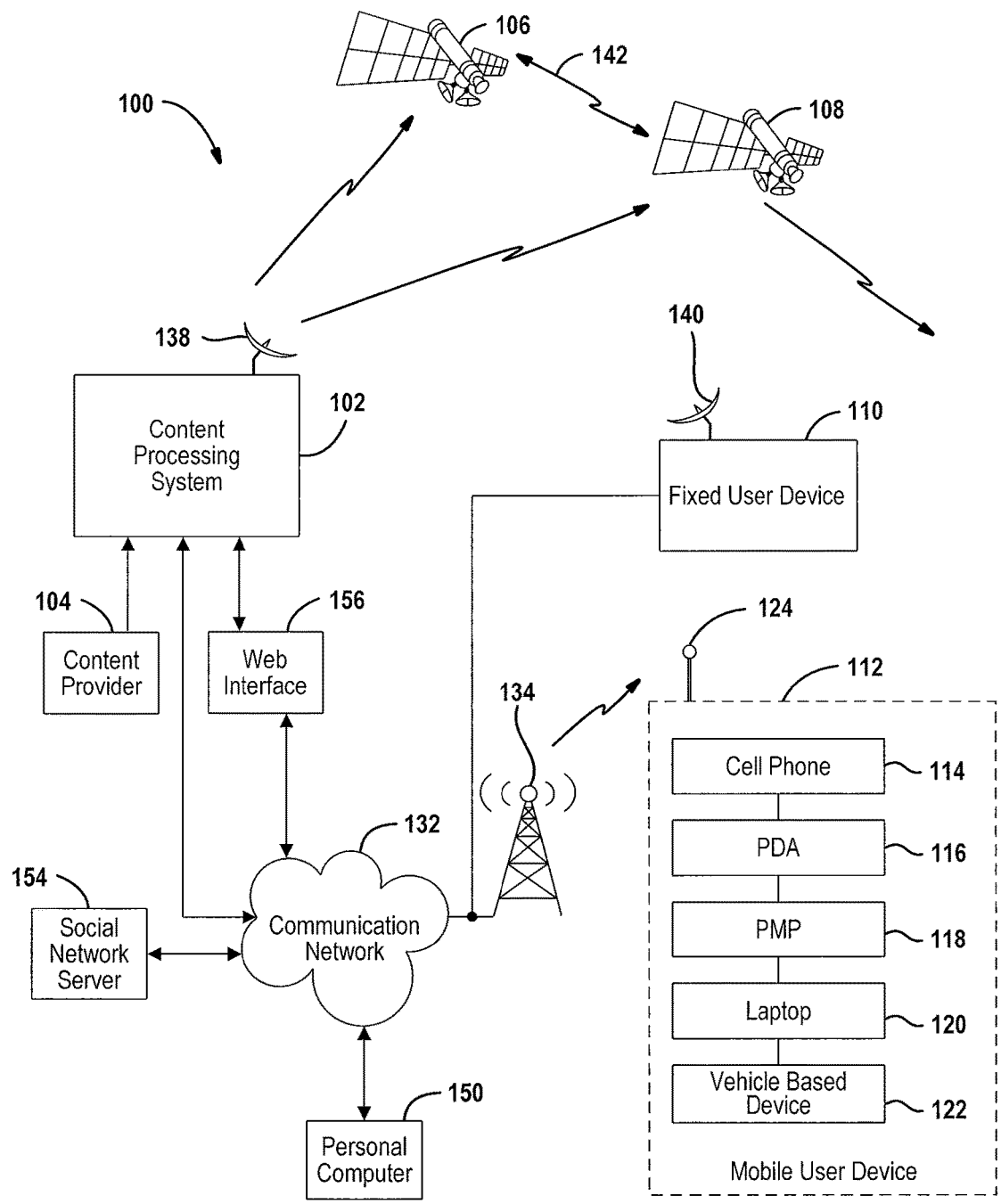
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the teem title will be used to refer to, for example, a movie itself and not the name of the movie.

Further, the following description is made with respect to an encoded content identifier. While the content identifier may refer to a unique content title or portion of content, the content identifier may refer to other attributes of content including, but not limited to, an actor, a channel and a category content. By way of example, an encoded content identifier may identify an actor list having available content from a particular actor or a channel list having content from a particular channel or category list having content from a particular category. The list may be referred to as an attribute list.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop or tablet computer 120, or a vehicle-based device 122. It should be noted that several mobile devices 112 and several fixed user devices 110 may be used in the communication system 100. The mobile devices 112 may each have a separate antenna generally represented by antenna 124. The antenna 124 may be used for receiving communication signals from the satellites 106, 108 as well as transmitting signals to the satellite.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112. Terrestrial communications may be received through the antenna 124.

Data or content provided to content processing system 102 from the content provider 104 may be transmitted, for example, via an uplink antenna 138 to the satellites 106,108, one or more of which may be a geosynchronous or geostationary satellite, that, in turn, rebroadcast the information over broad geographical areas on the earth that include the user devices 110, 112. The satellites may have inter-satellite links 142 as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. To receive the information rebroadcast by satellites 106, 108, each for user device 110 is communicatively coupled to a receiver through an antenna 140. The antenna 140 may also be used to receive terrestrial wireless signals from the antenna 134 of the terrestrial system.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Another type of user device is a personal computer 150. The personal computer 150 may be in communication with the communication network 132. The personal computer 150 may be used for ordering content or communicating with various external websites. The personal computer 150 may also be a tablet computer having a touch screen.

One example of an external website is a social network server 154. The social network server may be one of a number of different types of social network websites including Twitter® or Facebook®. The social network server 154 may receive outgoing messages from various devices including the fixed user device 110, the mobile user device 112, and the personal computer 150. The outgoing messages may include, but are not limited to, an electronic mail message, a social networking message, a text message, and a rating or comment message. Likewise, the fixed user device 110, the mobile user device 112, and the personal computer 150 may receive communications from the social network server 154 that have been posted by various other users, companies or non-users.

A web interface 156 may be in communication with the content processing system 102 and the communication network 132. The web interface 156 may be a website sponsored by the content processing system 102. In this example, "DIRECTV.com" may provide the web interface 156. The web interface 156 may provide program guide data for display as well as an ordering interface for scheduling or ordering the download of content at the user device. The web interface 156 may be displayed at the personal computer 150 or be provided to the mobile user device 112. Interaction between the web interface 156 and the social network server 154 and the fixed user device 110 may be provided.

Figure 2:
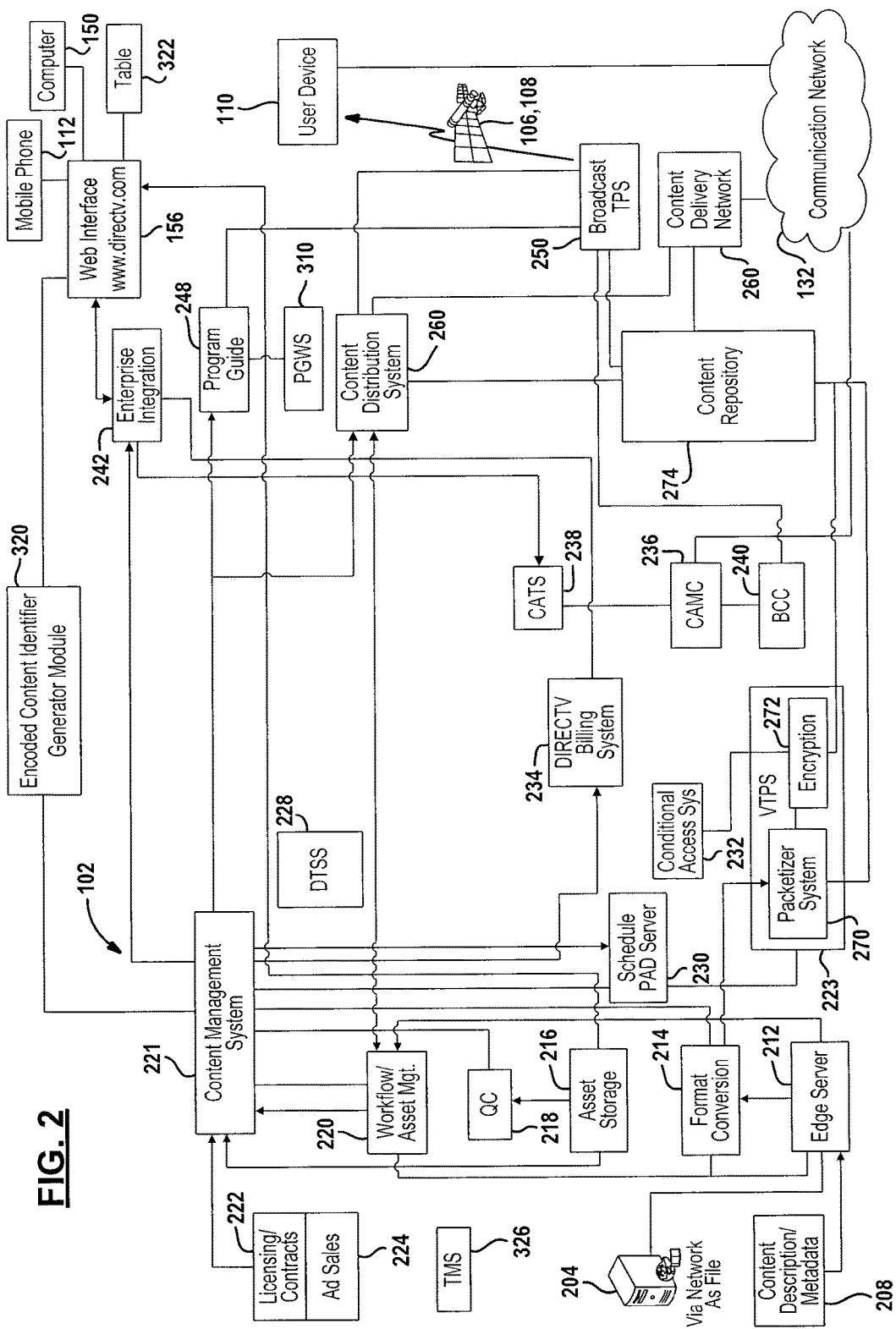
FIG. 2 is a detailed block diagrammatic view of the content processing system of FIG. 1.

Referring now to FIG. 2, the content processing system 102 of FIG. 1 is illustrated in further detail. The content processing system 102 may also be referred to as a head end.

The content provider 104 may include various types of content providers, including those that provide content via a network as a file in 204, or by way of a satellite, or by way of recorded media such as DVD, tapes and other means. The content provider 104 may also provide a content description and other metadata 208 to the system. An input server 212 such as an edge server may receive the various content and associated metadata and convert the format in a format conversion system 214. A house format asset storage server 216 may be used to store the content asset in a house format. Still image files, trailers, and other information may also be stored in the house format asset storage server. A quality control system 218 may monitor files for quality and completeness.

A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The content management system 221 may also receive file properties from the quality control system 218.

The video transport processing system (VTPS) 223 may encode the packets containing the content. The encoder may encode the data into various transport formats such as DIRECTV® proprietary formats, or industry standard formats. The encoded data is then packetized into a stream of data packets by a packetizer 270 that creates pre-packetized unencrypted files. The packetizer 270 also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

An encryption module 272 receives the output of the packetizer system 223 and encrypts the packets. The stream of data packets (i.e., a bitstream) is then broadcast encrypted by, for example, the well-known advanced encryption standard (AES) or the well-known data encryption standard (DES). In an example, only the payload portion of the data packets are encrypted thereby allowing a user device 110 to filter, route and/or sort received broadcast encrypted data packets without having to first decrypt the encrypted data packets. Fully packaged and encrypted files may also be stored in the content repository 274. Encryption may take place in the data portion of a packet and not the header portion.

The content management system (CMS) 221 generally controls the overall movement and distribution of content through the content processing system 102. The CMS 221 may be used to generate which content delivery network is to be used by generating a content delivery network identification. This will be described further below.

A licensing and contract information 222 and advertisements (ads) from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A schedule PAD server (SPS) 230 may be coupled to the content management system (CMS) 221. The CMS 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

The schedule PAD server (SPS) 230 may be used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed. The billing system 234 records that a user has been authorized to view a movie once an unlocking signal is received, and the user is billed for the movie. The billing system may receive an unlocking signal comprising a purchase request from the user. In this example the user may order or schedule the movie or programming by way of the personal computer 150 or mobile user device 112 connecting to the web interface 156. The mobile user device 112 of FIG. 1 may be capable of ordering content. In some configurations content may be streamed to the mobile user device 112. The billing system 234 may keep track of the content ordered and viewed by the mobile user device 112. The billing system 234 may bill the user account and send an authorization signal to the user device 110. The billing system 234 may also receive an unlocking signal comprising a report back that content has been unlocked at the user device. In this example, the user may order the movie via a user interface purchase menu of the user device. The user device 110 may allow viewing, and may report back the unlocking signal by way of a phone network connection or a broadband network connection to the head end. The billing system 234 may bill the user account when the report back is received. As will be described further below, content may be stored in a user device but may not be accessible until it is played back. Some content may never be unlocked. When the content is unlocked such as played back, the user account is billed with the unlock signal that is communicated back to the billing system 234. Push content, wanted list content or other content not specifically requested may be unlocked in this manner.

A billing system 234 receives pricing and availability information from the content management system 221. A conditional access system 236 receives callback information from the communication network 132. The conditional access system 236 may be used to generate authorizations, pay-per-view billing data, and callback data from the billing system 234. Remote record requests may also be provided from the conditional access transaction system 238. A conditional access system BCC 240 may be used to generate a conditional access packet (CAP) from the information from the conditional access system 236. The CAP may include a content title to be added to the wanted list at the user device. The CAP may also include the network location, channel and time that content will be broadcasted so that the user device may be tuned to it to record the content. The CAP may also include a content authorization signal so that the user device may allow the content to be viewed.

The billing system 234 may generate purchase data that is provided to the enterprise integration (EI) block 242. The enterprise integration block 242 may generate remote record requests to the conditional access transaction system 238. Content purchase requests and remote record requests may be generated through the web interface 156. Access to the website 244 may be obtained in numerous ways including through the computer 150 or a mobile user device such as a mobile phone 112. The computer 150 may be in communication with the web interface 156 through the internet, or the like. A website may prompt the user for ordering various content. Likewise, the mobile phone 112 may be in communication with the web interface. The mobile phone 112 may be a web-enabled device that allows access to the internet.

Various ordering information, such as ordering broadband video, pay-per-view, wanted list additions and various services may be received at the web interface 156. The ordering data may be derived from the encoded content identifier as will be described below. Various trailers may also be accessed by the users through the web interface 156 provided from the house format asset storage server 216. Enterprise integration block 242 may also receive guide information and metadata from the content management system 221.

Titles, descriptions, categories, actors and channel data from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. Such data may also include channel, actor and category data. A program guide may also include information that a user device uses to assemble programming for display to a user. For example, the program guide may be used to tune to a channel on which a particular program is offered. The program guide may also include a content delivery network identifier through which content is available for downloading. The program guide may also contain information for tuning, demodulating, demultiplexing, decrypting, depacketizing, or decoding selected programs.

Content files may also be provided from the content management system 221 to the content distribution system 260.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content, a category, channel or actor. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, pushed content, wanted list content, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. As will be described below, the content may be carouselled to repeatedly provide content to customers on a push basis or as requested through a wanted list.

In contrast, Internet-based delivery via the CDN 280 may also support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, an attribute list such as content category list, channel list or actor list, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110, 112 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A program guide web service (PGWS) 310 may receive listings from the program guide 248 so that access to program guide information may be communicated via the internet. The program guide web service 310 may interface with the web interface and other service partners for providing programming data thereto.

The content processing system 102 may also include an encoded content identifier generator module 320. The encoded content identifier generator module 320 may generate a unique content identifier for each unique content or content attribute that is available from the content processing system 102. As illustrated, the encoded content identifier generator module 320 is a separate component. However, the encoded content identifier generator module 320 may be incorporated into various other components of the content processing system such as the content management system 221, the enterprise integration module 342, the web interface 156 and the workflow/asset management system 220. Of course, other modules may also incorporate the encoded content identifier generator module 320.

The encoded content identifier generator module 320 may generate an encoded content identifier that identifies a unique video content or unique list or attribute. Every program, content or list at the content processing system 102 may have its own unique identifier (URI). The identifier may be referred to as a uniform resource identifier. Preferably, the encoded content identifier generator module 320 may be encoded to reduce the number of characters so that the identifier may be easily transmitted in various mediums including text-based messaging, social network messaging or other kinds of messaging. The uniform resource identifier may induce an action when selected by a device. The various actions may depend upon the device and a server response. For example, actions for selecting the URI may include, but not be limited to, watching the referenced program, recording the referenced program, sharing the referenced program with others or sharing the encoded content identifier link to the program with others. The action may also include retrieving a list of content, an actor list having content with the actor or a channel list with content available from a channel.

A table 322 may be associated with the web interface 156 or other type of server. The table 322 may be established by the encoded content identifier generator module 320. The table 322 may be used by the web interface 156 to obtain the proper content from the encoded program identifier. The table may include the Tribune Media Service® identifier, a program object identifier, a material identifier, a channel identifier, a date and time, a start time, a stop time and time code may be used to indicate an individual frame of video.

The encoded content identifier generator module 320 may also include various other types of identifiers. A material identifier may include an identifier type, an identifier format such as a series identifier, a movie identifier, a sport identifier, an event identifier, or a show identifier. A primary ID such as a series ID and a secondary ID such as an episode ID may also be provided. A material identifier may be used in place of a content identifier. The material identifier may identify a specific schedule broadcast.

The encoded content identifier generator module 320 may also include a version of the encoding specification. The encoding may use a rotation filter which is a simple substitution cipher where every character is substituted with another character to both encode and decode. Of course, various types of encoding may be used.

Figure 3:
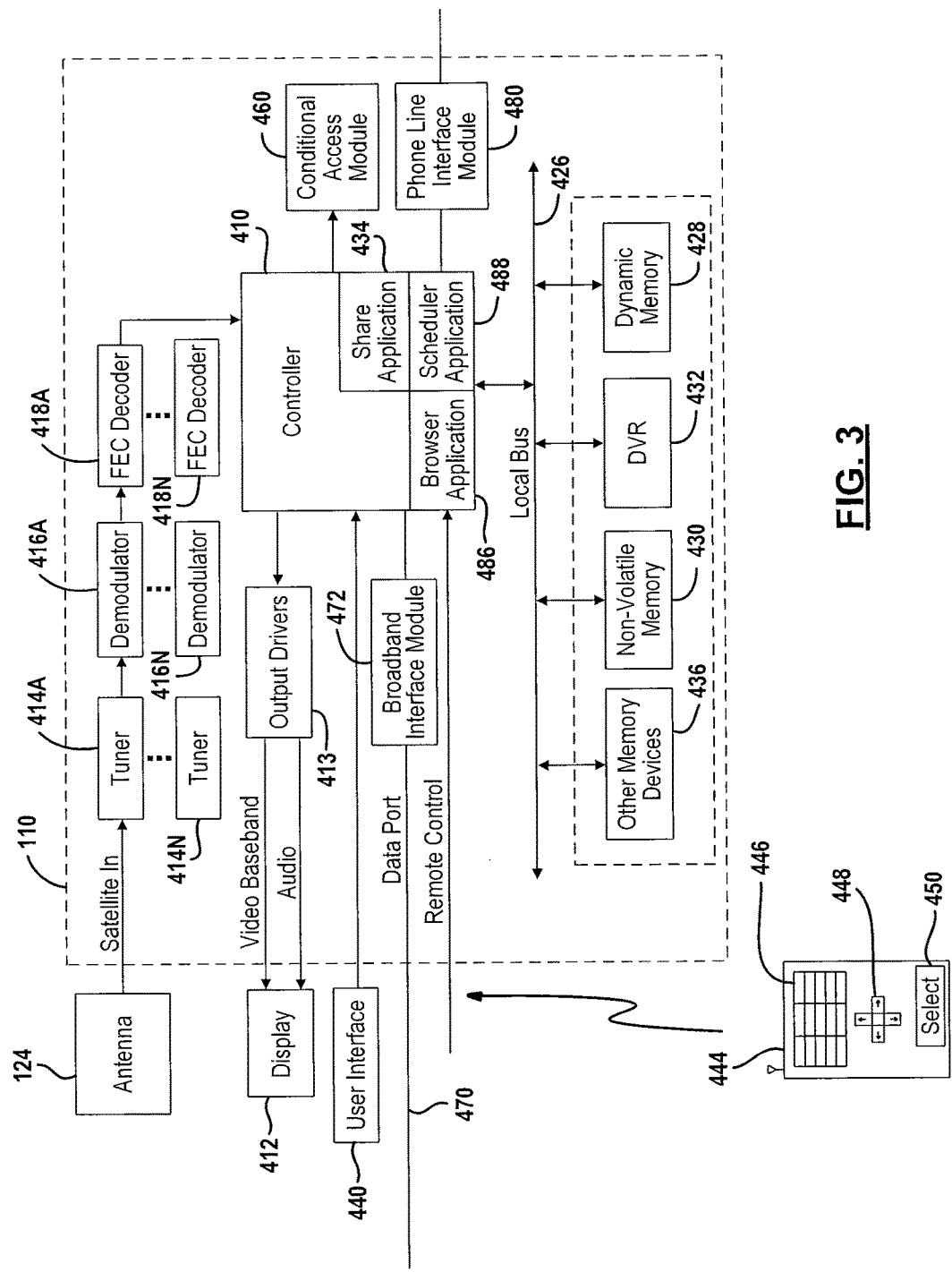
FIG. 3 is a detailed block diagrammatic view of the user device of FIG. 1.

Referring now to FIG. 3, a user device 110 such as a fixed user device is illustrated. A similar configuration for a mobile user device may also be used. The fixed user device may include the antenna 124. If the user device is a mobile user device, the antenna 124 may be a rotating antenna that is used to track the relative movement of the satellite or an omni-directional antenna that may receive antenna signals from various directions. Various other components may be eliminated depending on the type of device.

The user device 110 may include a controller 410. The controller 410 may control various operations as will be described below. The user device 110 may be in communication with a display 412 through output drivers 413. The output drivers 414 may generate desired audio and video output formats suitable for the particular display 412.

The controller 410 may be a general processor such as a microprocessor. The controller 410 may be used to coordinate the control and the functions of the user device. These functions may include the functions of a tuner 414, a demodulator 416, a forward error correction decoder 418 and any buffers or other functions. More than one tuner, demodulator and FEC decoder may be provided as indicated by the reference numerals "A" and "N". One constructed example may include four tuners, demodulators and decoders, although various numbers of tuners, demodulators and decoders may be provided depending upon the system requirements. The tuner 414 receives the signal or data from the individual channel. The demodulator 416 demodulates the signal to form a demodulated signal or demodulated data. The decoder 418 decodes the demodulated signal to form a decoded data or decoded signal.

The controller 410 may also be coupled to a local bus 426. The local bus 426 may be used to couple a memory, including a dynamic memory 428, such as RAM which changes often and whose contents may be lost upon the interruption of power or boot up. The bus 426 may also be coupled to a non-volatile memory 430. One example of a non-volatile memory is an EEPROM. One specific type of EEPROM is flash memory. Flash memory is suitable since it is sectored into blocks of data that may be individually erased and rewritten.

A digital video recorder 432 may also be in communication with the local bus 426. The digital video recorder 432 may be used for storing various data and various content. The various data stored within the DVR may include metadata such as titles, actors, directors, descriptions, posters, identifiers, availability start times, availability end times, pricing data, timing data and various other types of data.

Other memory devices 436 may also be coupled to the local bus 426. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select various information, change the volume, change the display appearance, or other functions. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access module card 460 (CAM) may also be incorporated into the user device. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals provided through the broadband interface module 472 and the phone interface module 480 may include ordering information and wanted list information. The wanted list information may be provided to the cinema queue 332 illustrated in FIG. 2. The wanted list data may be used to control the parameters of the content distribution system 260.

The controller 410 may be used for executing various applications at the user device 110. The applications may include a share application 484. The share application 484 may provide screen interfaces for sharing content or content identifiers by selecting various buttons or screen indicators using the user interface. A share application 484 may be used to generate a message such as a text message that includes the encoded content identifier associated with a particular program or content.

A browser application 486 may be used to initiate a browser for browsing the internet. The browser application 486 may launch a predetermined website such as the website for the web interface 156 illustrated in FIG. 2. The web interface 156 may automatically display a program guide and/or navigate to a referenced content title.

A scheduler application 488 may also be included in the controller 410. The scheduler application 488 may initiate a scheduler application that may be used as an ordering application or recording application for ordering or recording the content through the web interface 156 illustrated in FIG. 2. Because the encoded content identifier may include various data including a start time and an end time, minimal interaction with the user may be required. For example, a simple confirmation or selecting the particular digital video recorder or set top box within the household may be performed.

Figure 4:
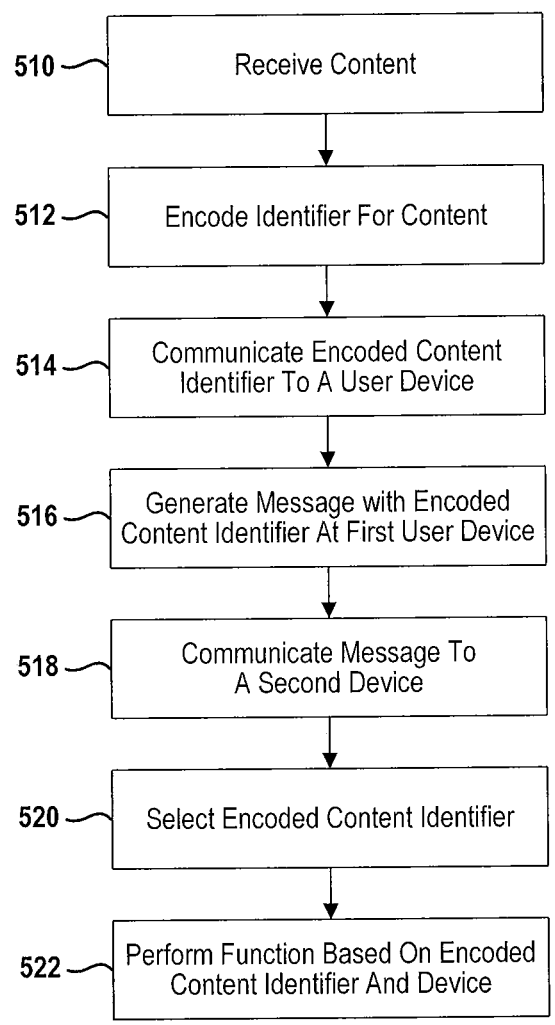
FIG. 4 is a block diagrammatic view of a high level method for operating the system.

Referring now to FIG. 4, a high-level method of operating the system is set forth. In step 510, content is received at the content processing system. The content may be received from various content sources as described above. The content may be various types of programs, movies, and the like. The content may also be received with metadata associated therewith. The metadata that is received with the content in step 510 may include a content identifier, a material identifier, a material type identifier, various types of primary and secondary identifiers such as a series identifier, an episode identifier, or other types of identifiers.

In step 512, an identifier for the content is encoded. A unique identifier may be generated for each content or content attribute within the content processing system. The encoded content identifier may be encoded to reduce the size of the link so that it may be easily transmitted in various types of systems including text messaging. The encoded content identifier may be formed from one or more of the different types of metadata and identifiers described above. The encoded content identifier may identify an entire content, a portion of content or list of content having a common attribute. The encoded content identifier may also include a start time and stop time. The encoded content identifier may also include a time code identifier to identify one frame or a number of frames of a piece of content. The encoded content identifier may be provided in a hypertext transfer protocol (HTTP) format to provide a link to the content or content attribute list. The encoded content identifier may initiate different actions based upon the user device initiating the action.

The encoded content identifier is reduced in size from an unencoded content identifier. The encoded content identifier is reduced in size to allow easy transmission to various websites including social networking websites. Text messaging and certain social networking websites allow limited size messages. Therefore, reducing the size of the identifier allows a greater amount of other data.

In step 514, the encoded content identifier is communicated to a user device. The encoded content identifier may be communicated to a plurality of user devices simultaneously. For example, the signals to the user device may be communicated through a network such as the satellite network or a terrestrial network. The encoded content identifiers may be communicated along with other data including program guide data. The signals including the encoded content identifiers may also be communicated separately from the content signals. For example, the content signals may be communicated via satellite while the encoded content identifiers may be communicated using a terrestrial network such as a broadband communication network.

In step 516, a message is generated at a user device with the encoded content identifier. The message is communicated in a message signal. The message signal may be a text message or other social networking message having the encoded content identifier therein. In step 518, the message having the encoded content identifier is communicated to another user device. The other user device may be a set top box, a mobile device, a computer or another type of user device. The message generated and communicated in steps 516 and 518 may be a selectable message from a group of messages available at the user device. Pre-defined messages, such as a ranking of a content or sharing of a content may be generated for each of user accessibility. Messages may also be entirely user-generated.

In step 520, the encoded content identifier is selected at the second user device. The selection may take place using a user interface. In step 522, a function based on the encoded content identifier and the type of second user device may be performed. Various examples are provided below for various functions. Functions may include watching the program referenced by the identifier, recording the content based on the encoded content identifier, sharing the content referenced by the encoded content identifier, and the like. The function may be different depending upon the type of content identifier. For example, a set top box may perform a different action than a mobile device for the same identifier. Examples of various types of functions will be described below.

Figure 5:
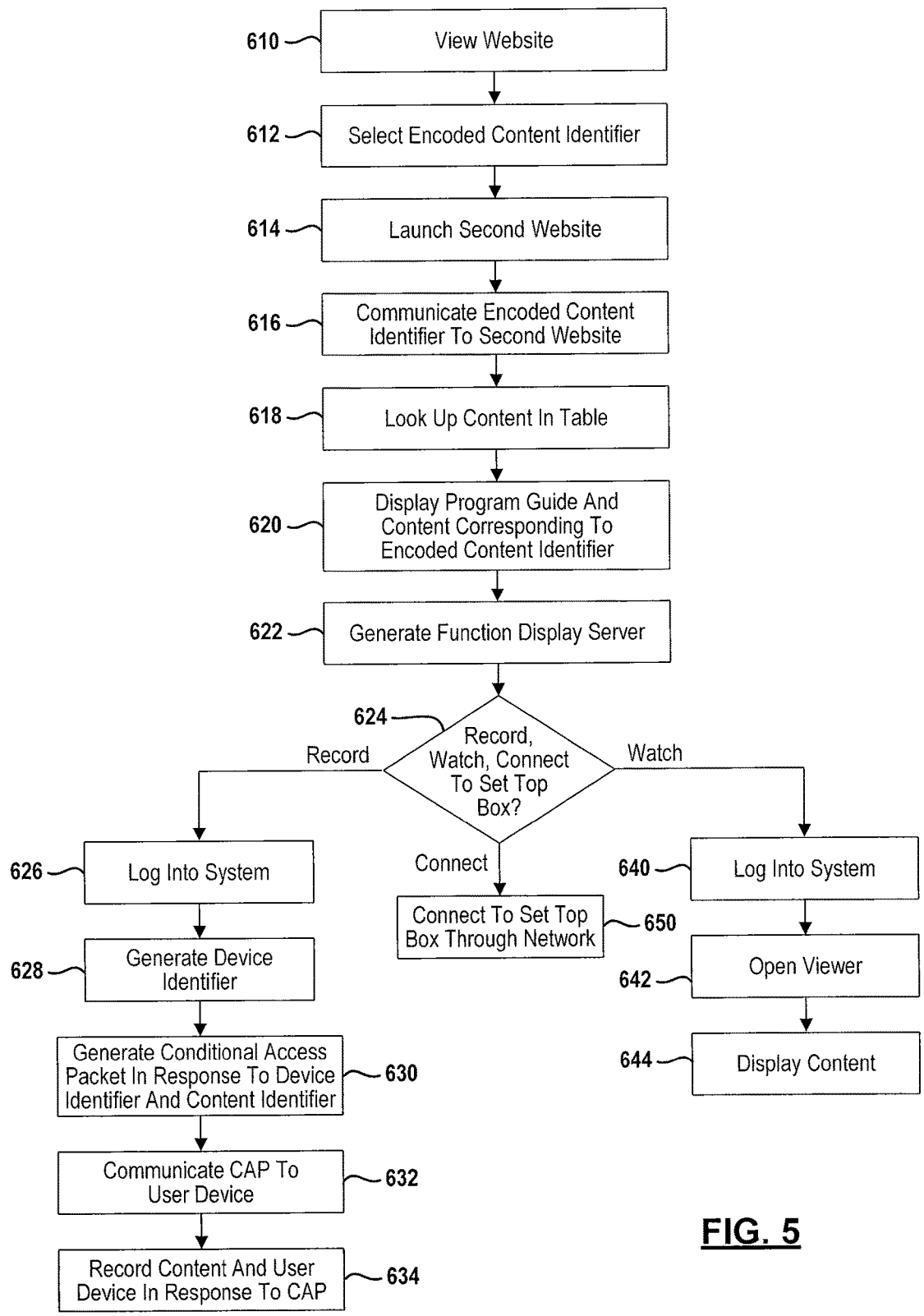
FIG. 5 is a flowchart of a method of operating a personal computer viewing a website and selecting an encoded content identifier.

Referring now to FIG. 5, a method performed using the personal computer 150 is illustrated. In step 610, a website is viewed. The website may be one of a variety of different types of websites, including a social networking website. Social networking websites, such as Twitter® or Facebook® display various messages that may contain an encoded content identifier. In step 612, the encoded content identifier is selected. Selecting an encoded content identifier may be performed using a user interface such as a keyboard, mouse, or other selection device. In step 614, a website different than the website in step 610 may be launched. The second website in this example is "DIRECTV.com." In step 616, the encoded content identifier is communicated to a server corresponding to the second website. In step 616, the encoded content identifier is communicated to the server of the website. In step 618, the encoded content may be looked up in a table so that the actual unencoded content may be retrieved. The table may merely be a decoder for decoding the encoded content identifier link. In step 620, a program guide or other data about the particular content in the encoded content identifier may be displayed. In this example, the program guide may display the content title on the display. The content title corresponding to the encoded content identifier may be highlighted on the computer display.

In step 622, an action display screen may be generated as with the content. The action display screen may generate a user interface for performing a further function. A function display screen may also have to be selected by the user. In step 624, choices for the particular function may be generated. In this example, recording, watching or connecting to the receiving device or set top box is the choice.

In step 626, if the user is not already logged into a system for accessing the content processing system, login may be required. The login may consist of entering an account identifier and a password, or the like.

When recording the content corresponding to the encoded content identifier is selected, step 628 is performed. In step 628, the user device identifier such as a set top box number or card access number may be selected. If only one set top box or other user device is associated with an account, this step may not be performed. The device identifier may be provided by selecting an identifier or other graphical user interface icon such as the room name for a particular device.

In step 630, a conditional access packet is generated at the content processing system in response to the device identifier, if required, and the content identifier. Other data may also be contained in the conditional access packet. The conditional access packet may also contain a channel number, a content delivery network identifier, a time, a channel, and other data required for recording the particular content. In step 632, the conditional access packet (CAP) is communicated to the user device such as a set top box. Various methods for communicating the CAP may be provided. For example, the conditional access packet may be communicated using the satellites. However, the conditional access packet may also be communicated through a terrestrial network such as a broadband network. The conditional access packet may be communicated wirelessly through a cellular phone network as well. The conditional access packet may be communicated using a different network than the content as communicated.

In step 634, the user device that receives the conditional access packet records the content according to the data contained in the conditional access packet. For example, the user device may tune to a predetermined channel at a predetermined time and record for a predetermined amount of time a particular content with a particular content identifier identified in the conditional access packet.

Referring back to step 624, if watching the program or content is selected, step 640 may be performed. In step 640, the user may be required to log into the system as described in step 626. After authenticating the user, a media viewer may be opened in step 642. In step 644, the content corresponding to the encoded content identifier is displayed in the viewer.

Referring back to step 624, the computer may also be connected through the network to the set top box directly. TCP/IP protocol may be used. The computer may obtain content, schedule recordings or set other controls directly.

Figure 6:
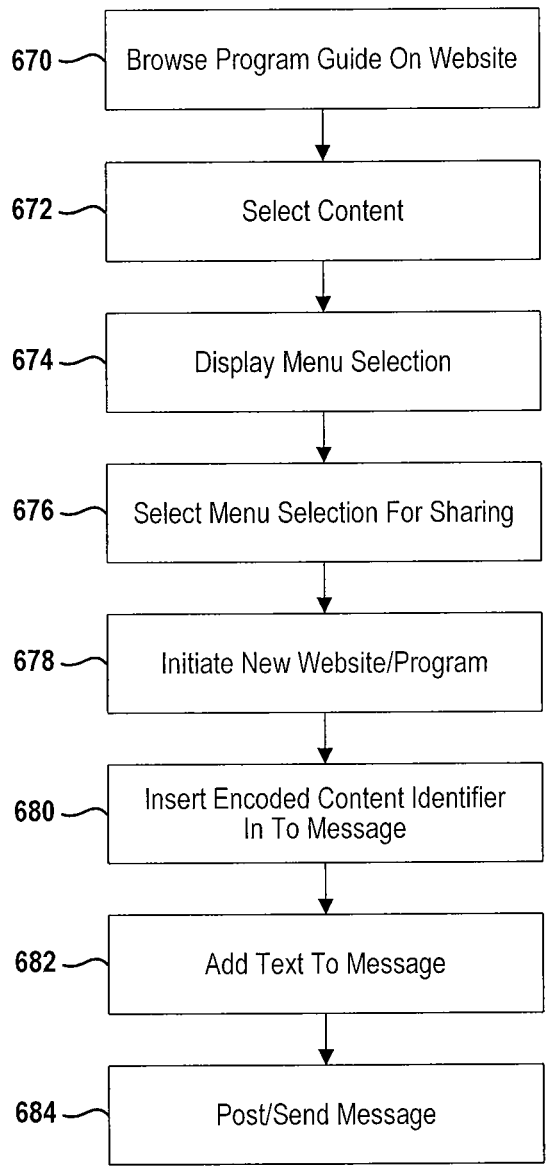
FIG. 6 is a flowchart of a method for operating a computer to share the encoded content identifier.

Referring now to FIG. 6, a method for operating a computer for sharing content or a content identifier link is set forth. In step 670, a user of a computer may browse to a website such as a website hosted or supported by the content processing system. For example, the user may be associated with a server at the web interface 156 illustrated in FIG. 1. As the program guide is browsed, the program guide may be moved or searched in various manners. When a show of interest is set forth, step 672 is used for selecting a particular show or content. By selecting the content, various menu selections may be displayed on the display associated with the computer in step 674. The selections may be performed using a user interface such as a mouse or keyboard. Forming selections may be performed for obtaining further information such as program details, determining the parental rights, recording to a receiver, or generating an e-mail or social networking link. E-mail, Facebook® and Twitter® may all be used for sharing the content or content link. By selecting a menu selection in step 676, sharing may be initiated by opening a new program or website in step 678. A new website such as a social networking website may be opened. For sharing using electronic mail, a program such as Outlook® may be used for providing a link using an encoded content identifier for a particular content.

In step 680, an encoded content identifier corresponding to the selection of content is provided into the message. Text may also be submitted into the message by the user for inserting various comments and the like. This is performed in step 682. In step 684, the message generated with the encoded content identifier is posted to a website or sent according to an e-mail through the network.

Figure 7:
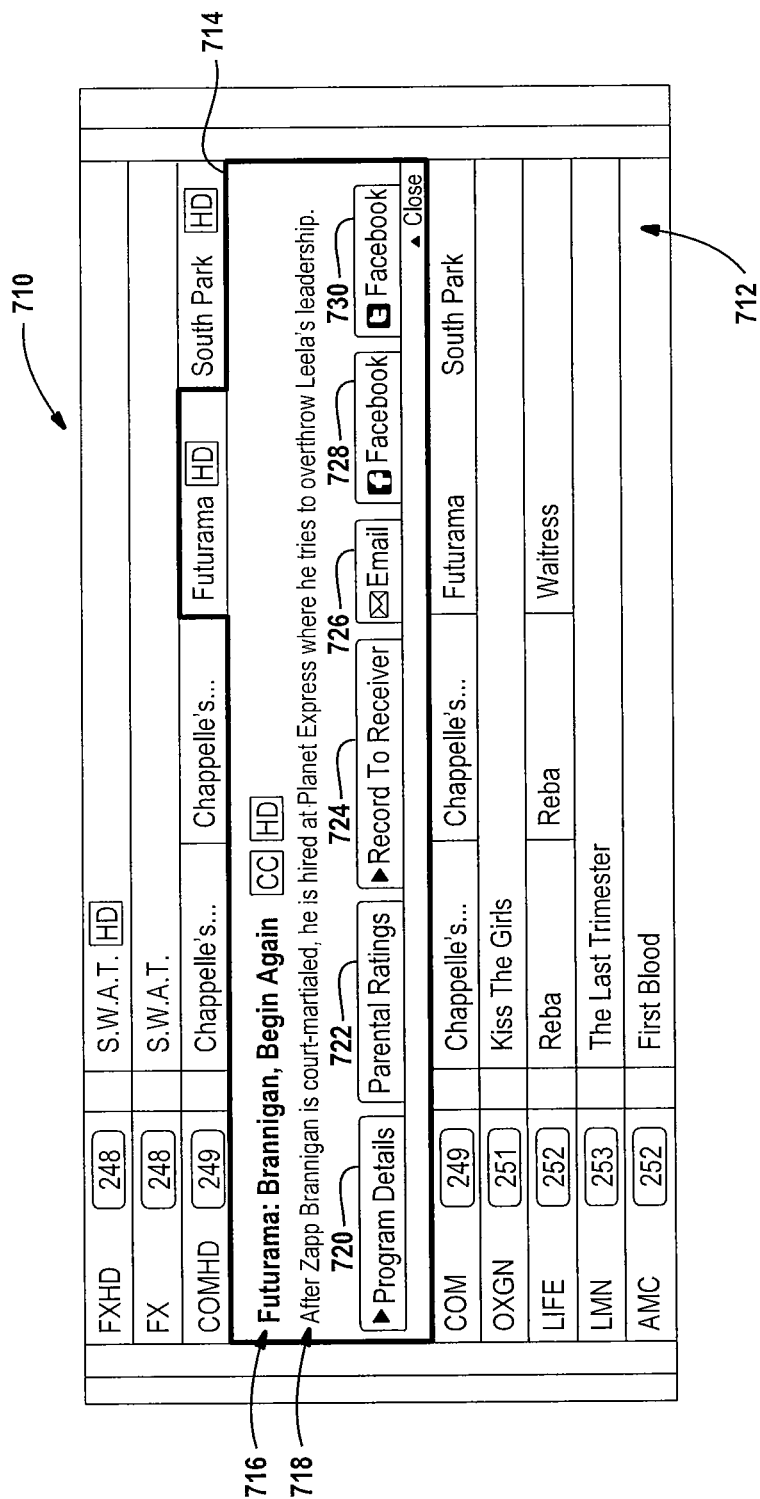
FIG. 7 is a screen display of a program guide on a personal computer.

Referring now to FIG. 7, a screen display 710 illustrating a program guide 712 is set forth. The program guide has a selection 714 that may be highlighted after selection using the user interface. The selection 714 may include a title area 716 and a description area 718. Various other selections may be highlighted from the program guide 712 including various user interface buttons such as a program detail button which, when selected, may provide further information regarding the program or content. Button 722 may provide the user with parental ratings. Step 724 may allow the user to record to a particular receiver or set top box. Button 726 may generate an e-mail sharing of the content using a selection link. A Facebook® 728 and a Twitter® link 730 are examples of links to social networking websites. By selecting the links 728, 730 the encoded content identifier may be communicated or posted on a website.

Figure 8:
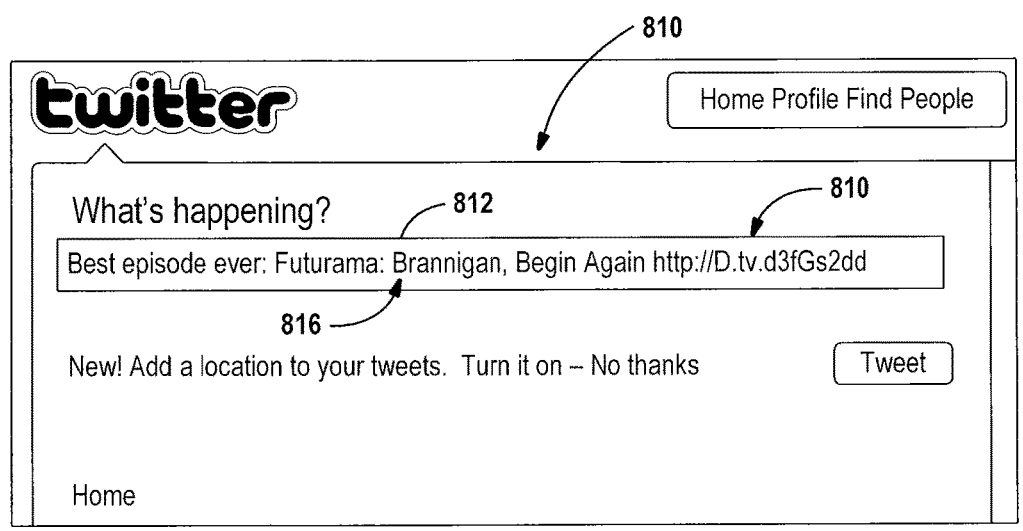
FIG. 8 is a screen display from a social networking website.

Referring now to FIG. 8, a screen display 810 is generated by selecting the button 728 illustrated in FIG. 7. In this example, a Twitter® box 812 is populated with the encoded link 814 for the content selected from FIG. 7. Other text 816 may also be inserted into the box 812 using the user interface. The social networking message may include both the link and the message.

Figure 9:
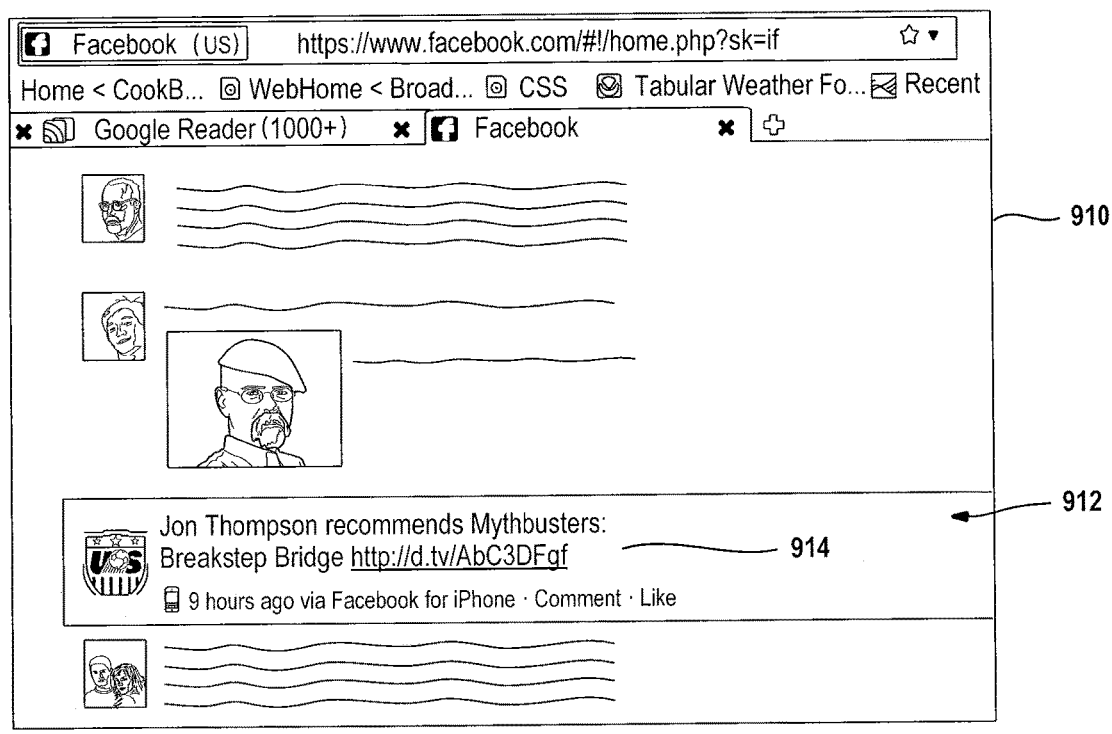
FIG. 9 is a screen display of a second social networking website having an encoded content identifier.

Referring now to FIG. 9, a screen display 910 of a web browser on a social networking site is illustrated. In this example, Facebook® is selected as the example. In this example, a message 912 having a link 914 is displayed. The link 914 corresponds to a recommendation from another user. By selecting the encoded content identifier, another website or other action may be launched. This corresponds to the steps performed in FIG. 5.

Figure 10:
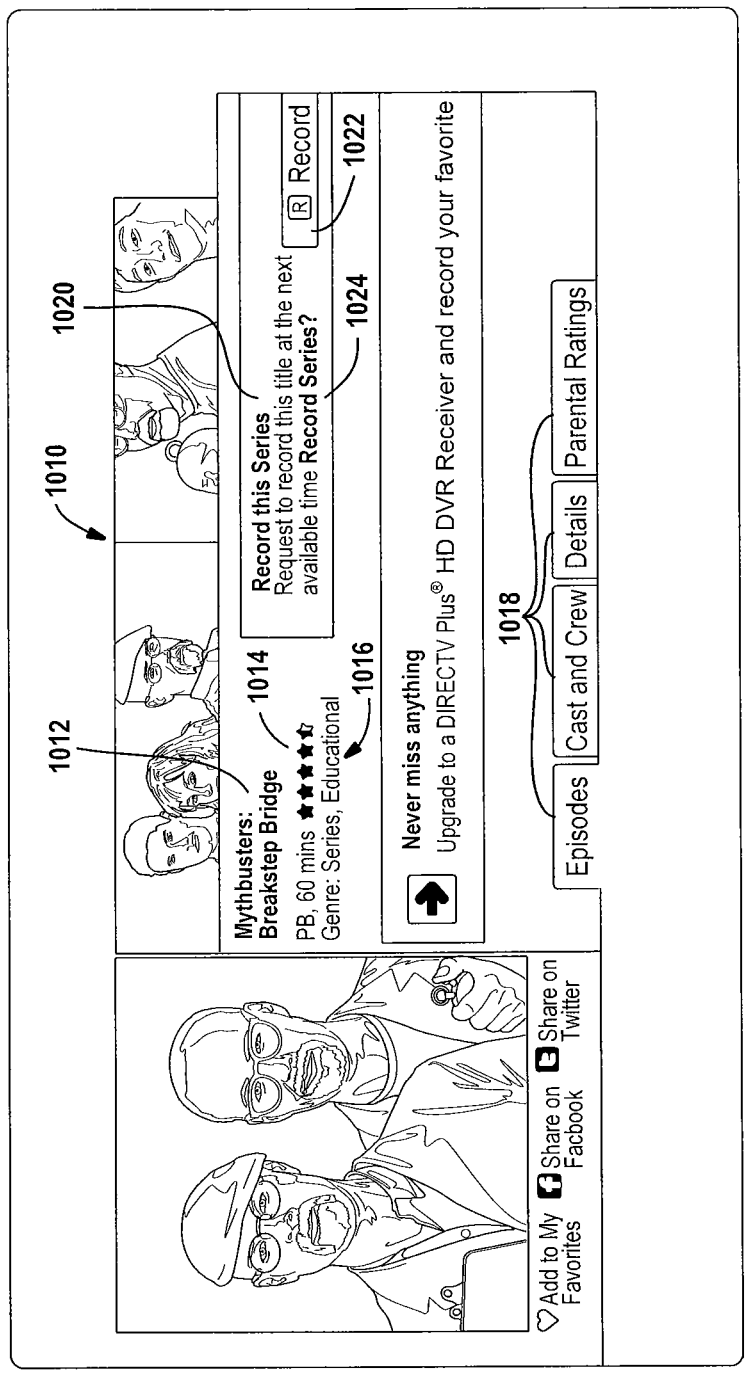
FIG. 10 is a screen display for further content after selecting in FIGS. 8 and 9.

Referring now to FIG. 10, when the link 914 was selected in FIG. 9, the website for the content processing system such as "DIRECTV.com" may be selected. In this case the screen display 1010 illustrates a screen display having details corresponding to the encoded link 914. Prior to generating the screen display, a table may be consulted to convert the encoded content identifier into the actual link. The screen display 1010 may include various data such as a title section 1012, a rating 1014, a genre 1016, and other tables 1018 for seeking further information. The tabs 1018 may correspond to an episodes tab, a cast and crew tabs, a details tab and a parental ratings tab, for example. The screen display 1010 may also provide a selection box 1020 that includes instructions for recording the content corresponding to the encoded content identifier. A record button 1022 may be used to request recording of the title at the next available time. Should the user desire to record the entire series corresponding to the encoded content identifier, a record series button 1024, which is illustrated as highlighted characters, may be selected. Selections may be performed by selecting the various buttons and screen displays using a user interface of the user device. It should be noted that after selecting one of the series recording button 1014 or the current title recording button 1022, the process set forth in FIG. 5 may be performed.

Figure 11:
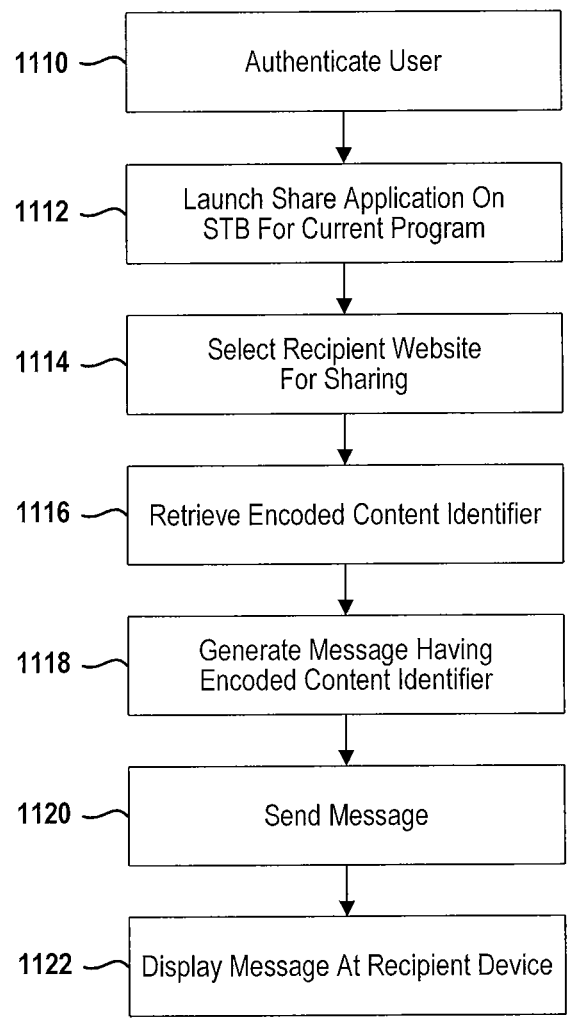
FIG. 11 is a flowchart of a method for operating a set top box.

Referring now to FIG. 11, a method for using the set top box or receiving device for sharing content identifiers outside of the set top box or receiving device is set forth. In step 1110, the user may be authenticated. A user may be authenticated in various ways including the method set forth below in FIG. 12. After the user has been authenticated, step 1112 launches a share application on the set top box for the current program. While watching a particular program or content, a share application may be launched by selecting a share button from the screen display. One example will be provided below. Once the share application is selected in step 112, step 114 may select a recipient website for sharing. For example, various choices including social networking choices, e-mail, and the like may be selected. Again, the user interface may be used for performing this selection. In step 1116, the encoded content identifier corresponding to the content is retrieved. In step 1118, an outgoing message having the encoded content identifier may be generated. The message may include the encoded content identifier as well as other contents that may be user-selectable. The destination of the message, depending upon type, may also be selected. In step 1120, the message is sent through a network to the desired website or recipient. In step 1122, the message is displayed with the encoded content identifier at the recipient device. The recipient device may be another set top box, a website, a mobile device, or other type of device.

Figure 12:
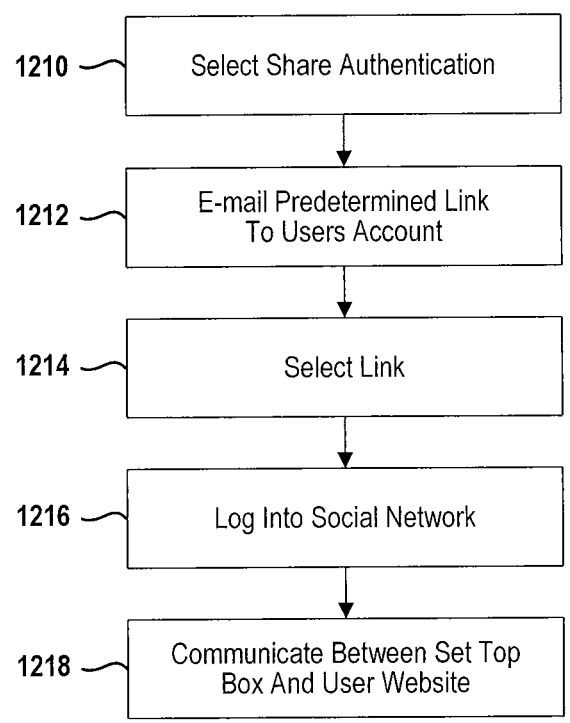
FIG. 12 is a flowchart of a method for authenticating social networking sites according to the present disclosure.

Referring now to FIG. 12, a method for authenticating a user at a set top box or receiver device is set forth. In step 1210, a selection for sharing authentication is provided. In step 1212, an e-mail with a pre-determined link to a user's account may be generated. The e-mail may be selected from a screen display on the set top box. Once the e-mail is communicated to the user's account, a computer may be used to select the link transmitted in step 1214. By selecting the link, the social network or other program may require logging in or authentication by entering a password in step 1216. Once this is performed the set top box and the website server may provide communication in step 1218. Communication signals may be communicated from the set top box to the website or vise versa. Of course, other methods of authentication may be performed such as merely entering a password and user identifier. Likewise, authentication at a mobile device may also be performed in this manner.

Figure 13:
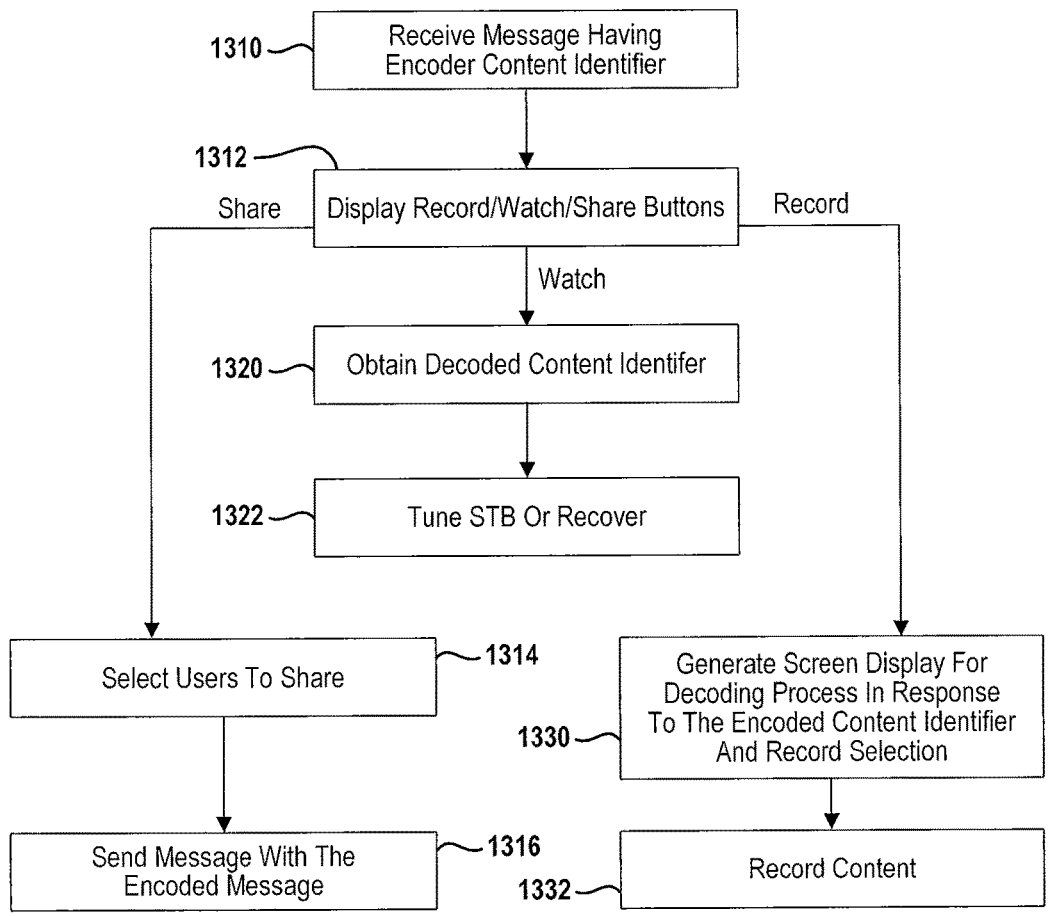
FIG. 13 is a flowchart of a method for operating a set top box for receiving encoded content identifiers.

Referring now to FIG. 13, the set top box or receiving device may be capable of receiving messages signals having an encoded content identifier therein. In step 1310, a message having an encoded content identifier is received. In step 1312, the message may be displayed as well as a record watch or share buttons. To share the encoded message, the user may select a share button in step 1312. Step 1314 allows the users to select different other user identifiers for sharing the selected encoded content identifier. In step 1316, a message within a message signal may be sent to the users identified in step 1314 with the encoded message.

Referring back to step 1312, when a watch button is selected, step 1320 may obtain a decoded content identifier corresponding to the encoded content identifier received in step 1310. Step 1320 may obtain the decoded content identifier by decoding the signal at the set top box or communicating the encoded signal to a server at the content processing system for decoding. Based on the content identifier, the set top box or receiving device may be tuned to the channel corresponding to the encoded content identifier in step 1322.

Referring back to step 1312, a record button may also be selected. When the record button is selected, the screen display for the recording process may be generated in response to the encoded content identifier. For example, a page illustrating content details may be provided similar to that set forth in FIG. 10 above. In response to this, a selection button may be selected and the content recorded in step 1332.

Figure 14:
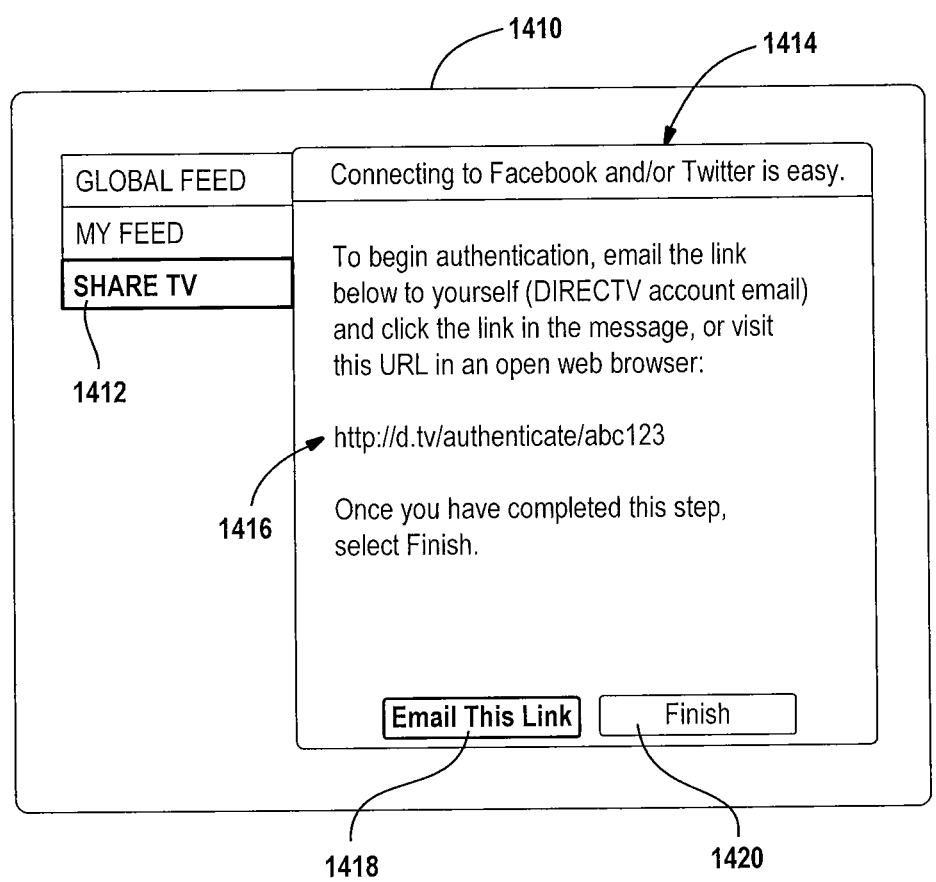
FIG. 14 is a screen display for initiating authentication at a set top box.

Referring now to FIG. 14, a screen display 1410 illustrating the beginning of an authentication process is set forth. A "SHARE TV" button 1412 is selected in the process. An instruction portion 1414 is displayed with instructions for performing the authentication. The authentication may be performed using a web browser and communicating a link 1416.

A button 1418 which states "e-mail this link" may be selected for e-mailing the link. The link may be e-mailed to a selected user for authenticating into the social networking site and linking the two sites. After the process is finished, button 1420 may finish the process. Failure instructions may be generated to re-e-mail the link in place of the instruction in step 1414.

Figure 15:
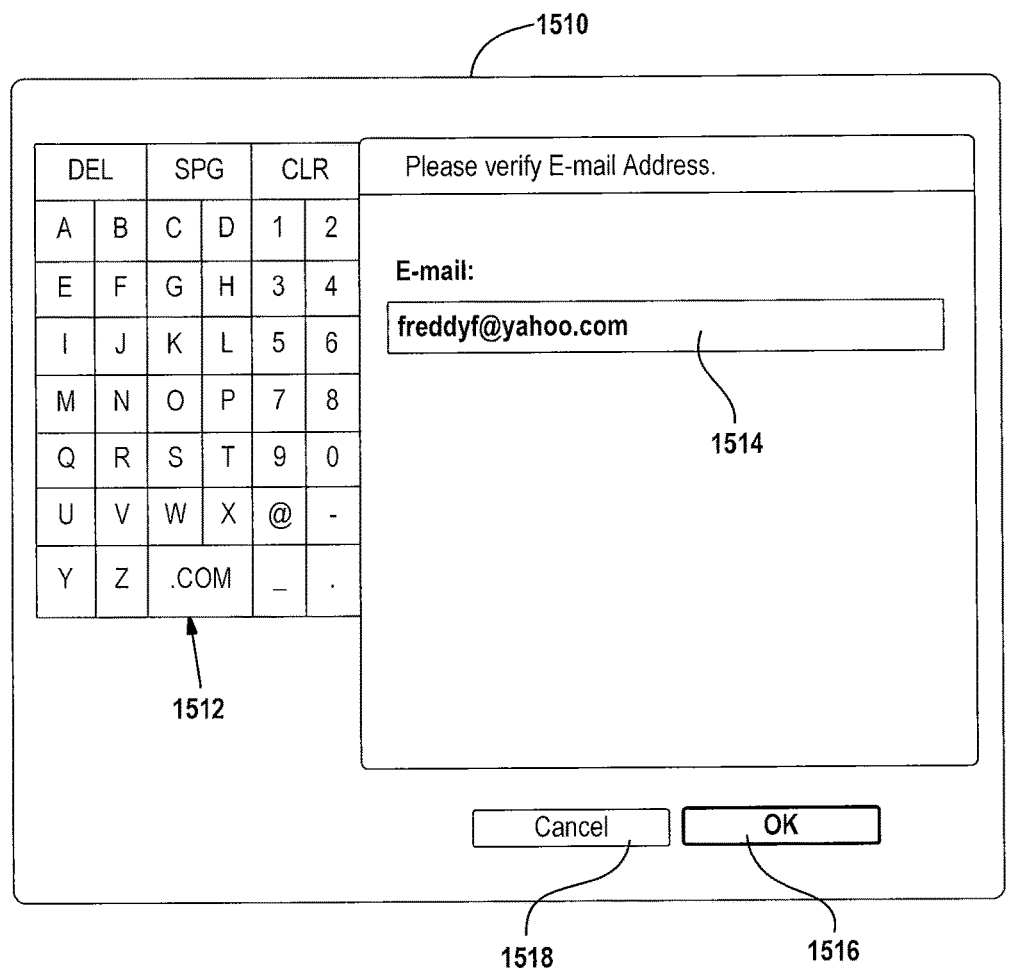
FIG. 15 is a screen display of an e-mail entry process for initiating the authentication process.

Referring now to FIG. 15, a method for providing an e-mail address is set forth in the screen display 1510. A keypad 1512 is illustrated with an e-mail box 1514 for displaying the characters selected using the keypad 1512. Characters may be selected on the keypad with a user interface. Once the e-mail is selected, the e-mail with the link 1416 may be communicated. After the e-mail is entered, the "okay" button 1516 may be selected for sending the e-mail. A cancel button 1518 may also be used to cancel the process.

Figure 16:
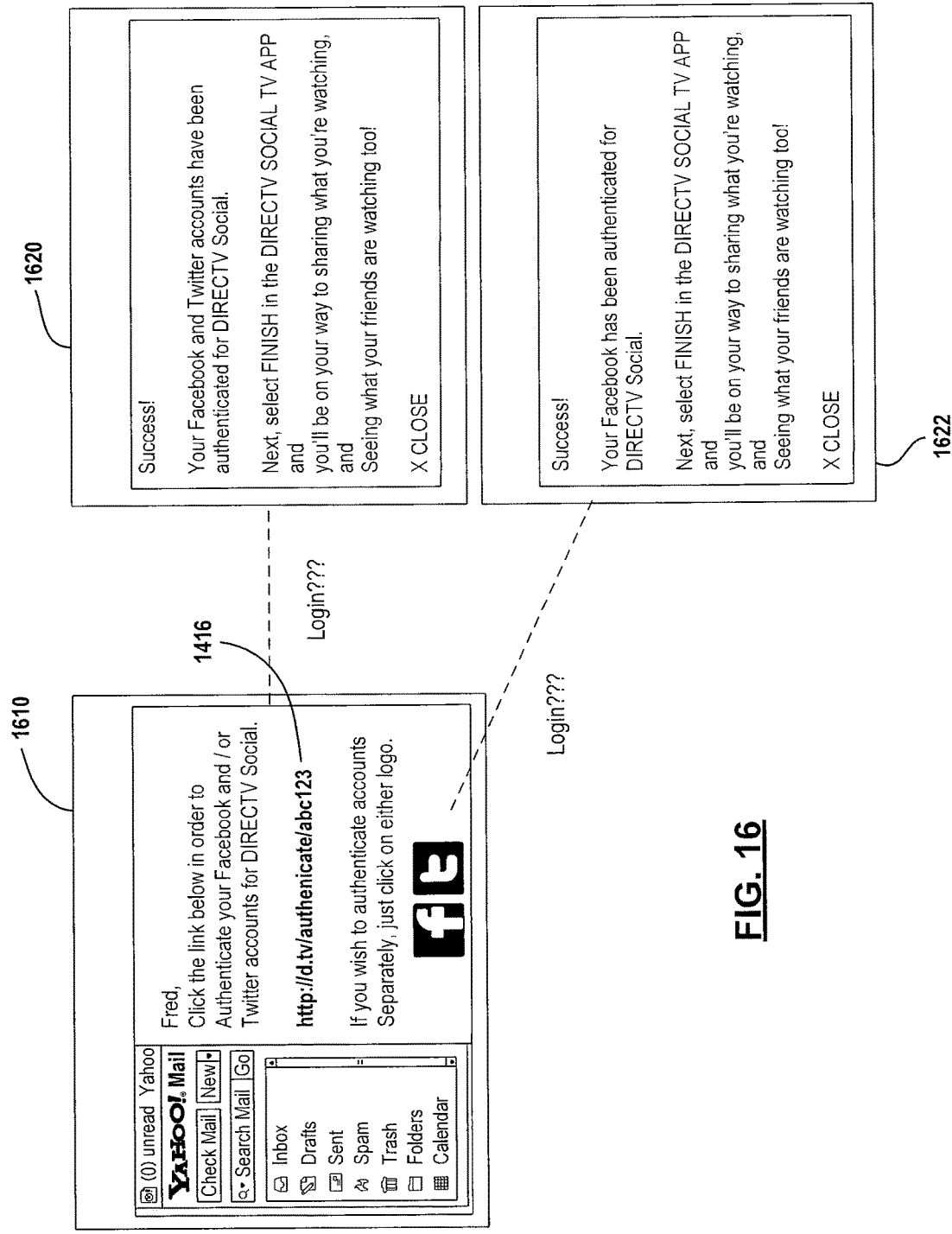
FIG. 16 illustrates a plurality of screen displays used for authenticating the social networking website.

Referring now to FIG. 16, screen displays illustrating the authentication process are set forth. The first screen display 1610 may provide the link 1416 illustrated in FIG. 14. The screen display 1410 is a screen display of a computer associated with the user. By selecting the link 1416 and entering a user identifier, a success screen 1620 may be generated for Facebook® and/or Twitter® or other social networking website. Another success screen display 1622 is illustrated for a Facebook® account. After selecting the link and entering a login identifier, the server associated with the content processing system may allow sharing and linking between the set top box or receiving device and social networking website.

Figure 17:
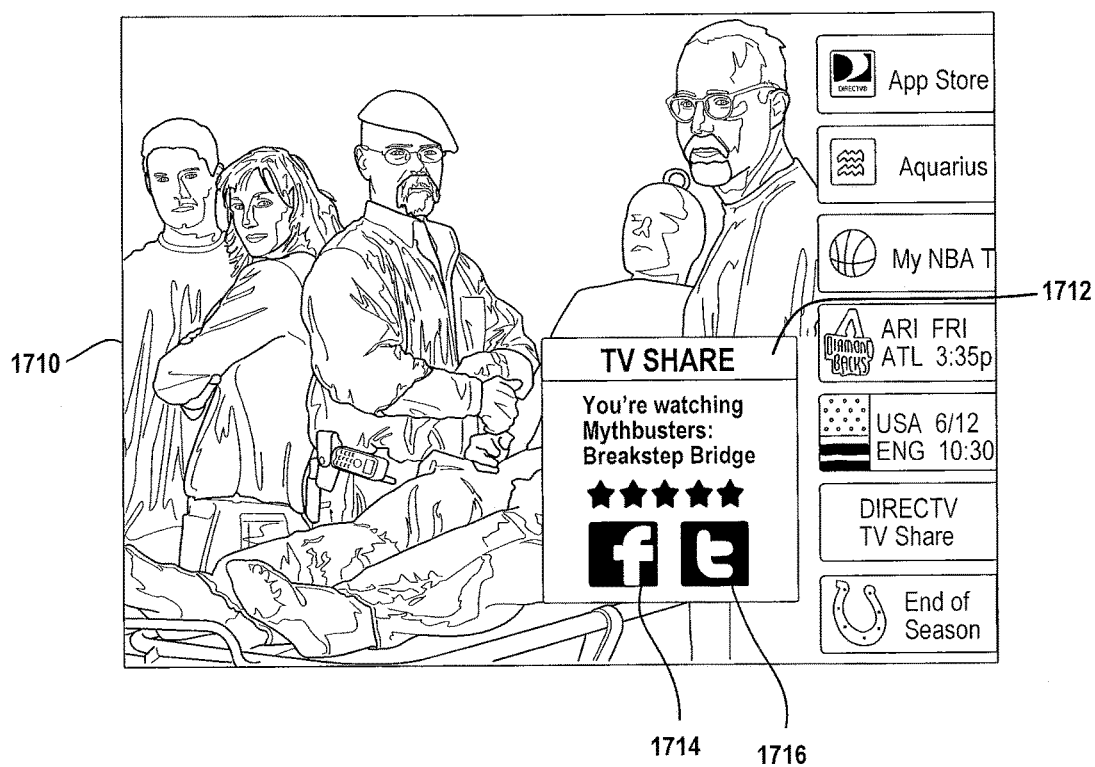
FIG. 17 is an alternate screen display for a set top box for sharing content.

Referring now to FIG. 17, a screen display 1710 illustrating a TV share application 1712 for a receiver or set top box is set forth. In this application a Facebook® button 1714 and a Twitter® button 1716 allow the user to select a social networking website to generate a message having the encoded content identifier therein. Selections may be performed using a user interface associated with the set top box or receiving device.

Figure 18:
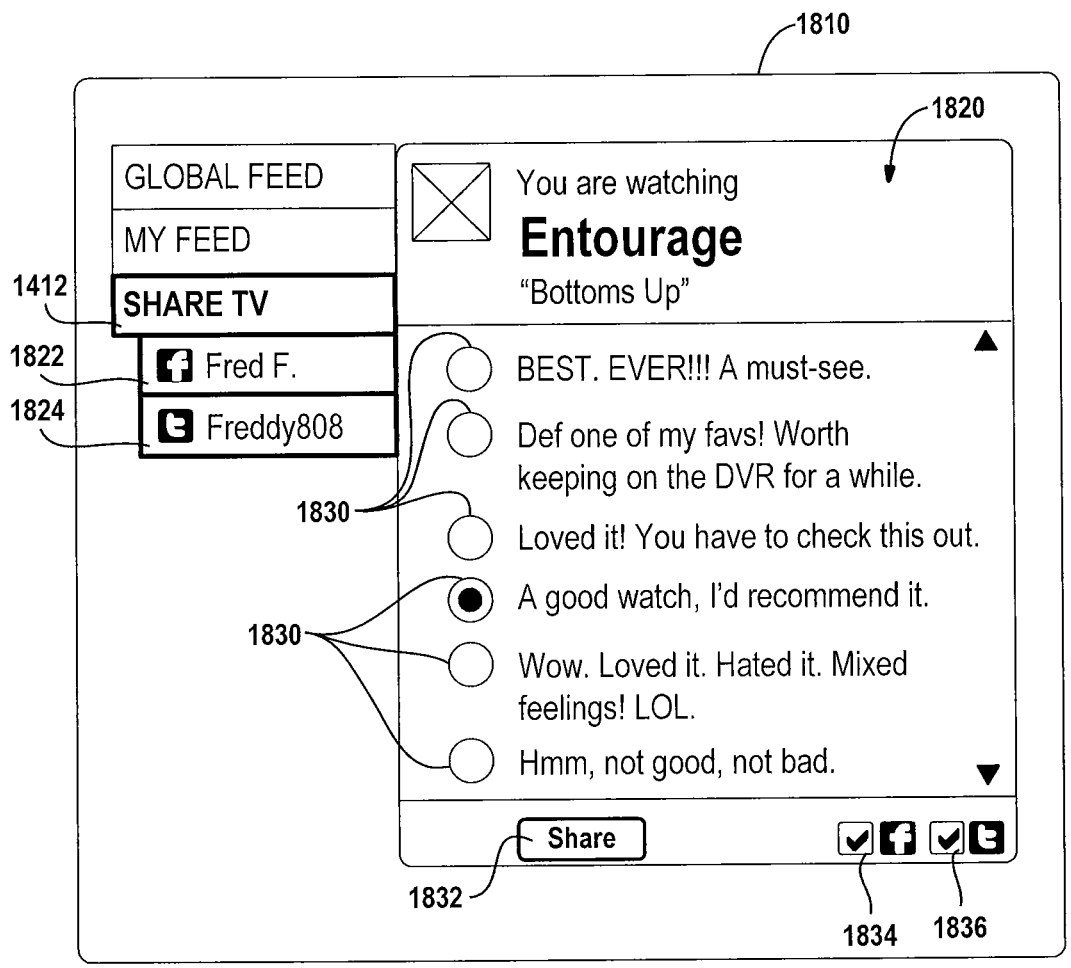
FIG. 18 is a screen display from a set top box for providing ratings or comments regarding the content.

Referring now to FIG. 18, when the share television button 1412 is selected from the display illustrated in FIG. 17 or after authentication in FIG. 14, a screen display 1810 is used for sharing a content identifier. In this example, a comment box 1820 is generated to generate a plurality of predetermined messages for commenting on or rating the content. User account boxes 1822 and 1824 may display the accounts associated with the particular set top box that were previously authenticated. Rating selections 1830 may be easily selectable by selecting a circle next to each of the selections. In this example, various types of comments such as "best ever" "definitely one of my favorites," "a good watch," "I recommend it," "Wow." "I loved it." "I hated it" and a "not good not bad" selection may be performed. A share button 1832 may be selected for sharing. Prior to selecting the share button, the various account indicators 1834 and 1836 may be checked or unchecked so that simultaneous communication of messages for the different social networking sites may be provided.

Figure 19:
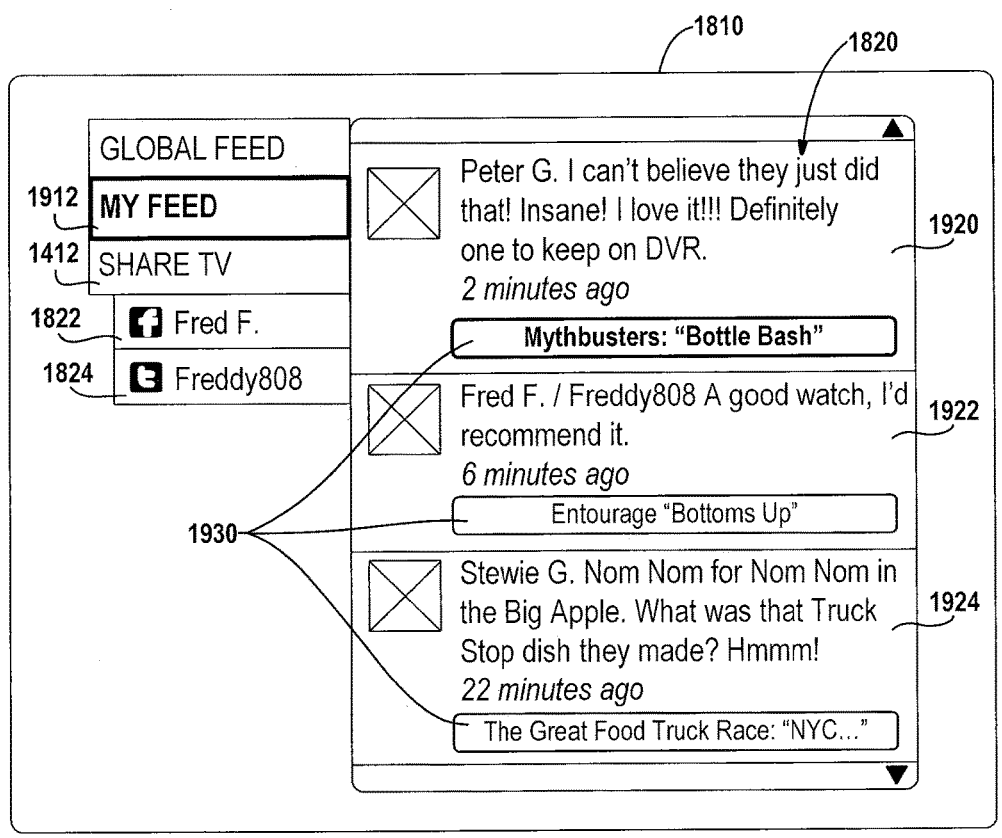
FIG. 19 is a screen display for a set top box for selected feeds from social networking sites.

Referring now to FIG. 19, a screen display 1910 illustrated in response to a "MY FEED" button 1912 is set forth. The MY FEED button 1912 may be selected for monitoring messages 1920, 1922 and 1924 from various users. By selecting a selection button 1930 that is contained in each of the messages 1920-1924, the particular content may be selected for recording, sharing, or watching. The MY FEED button 1912 may generate message signals according to the account settings at the social networking websites. The same users may be monitored through the set top box after authentication.

Figure 20:
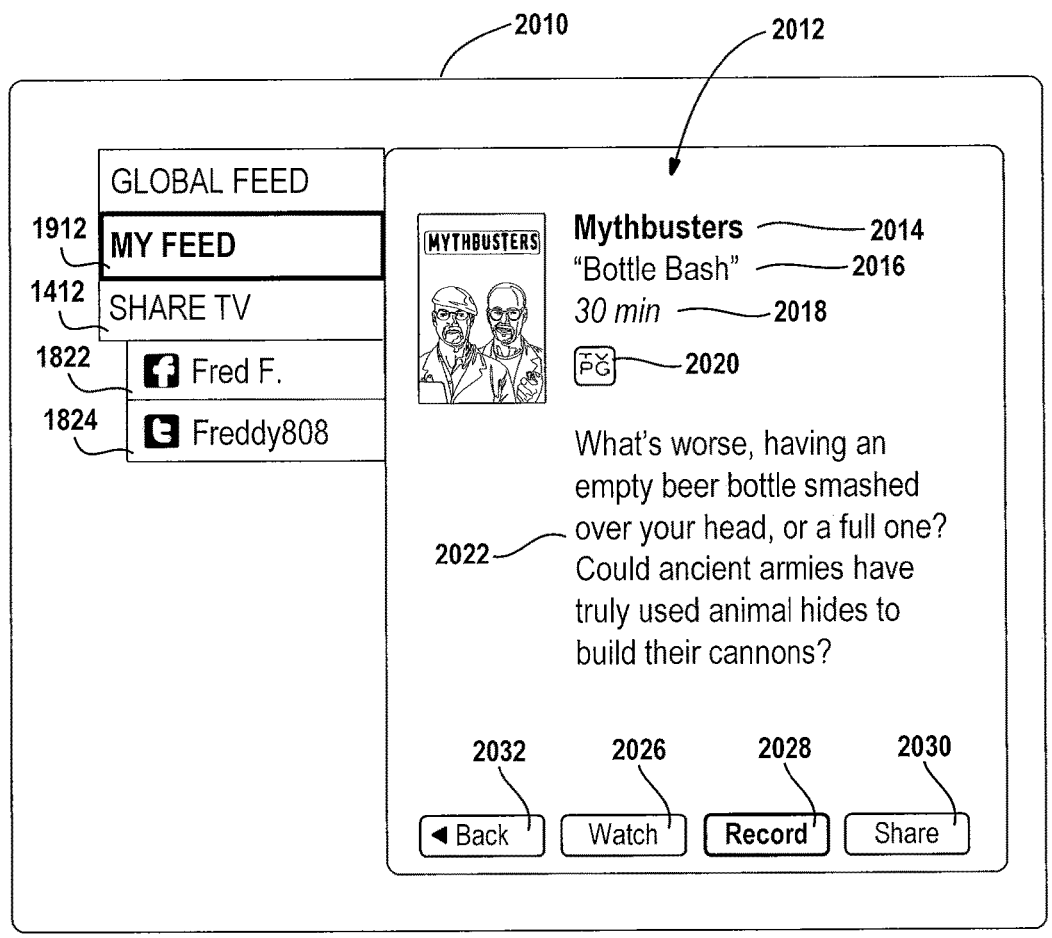
FIG. 20 is a screen display for describing content details.

Referring now to FIG. 20, a screen display 2010 is illustrated after selecting one of the selection boxes 1930 illustrated in FIG. 19. Further information may be provided in the display box 2012 for the selected content. In this example, a content title 2014 is provided. An episode title 2016 is also provided. The time 2018 and rating 2020 are also provided. A short description 2022 may also be provided. Various selection buttons such as a watch button 2026, a record button 2028, and a share button 2030 may also be displayed. A back button 2032 may also be selected. By selecting the back button 2032, the screen display illustrated in FIG. 19 may be displayed. By selecting the watch button, the set top box may generate a selection signal for tuning the tuner to the proper channel. By selecting the record button 2028, a recording function may be generated as is further described below. The share button 2030 may also bring up a user interface for selecting a content and adding a message with an encoded content identifier therein.

Figure 21:
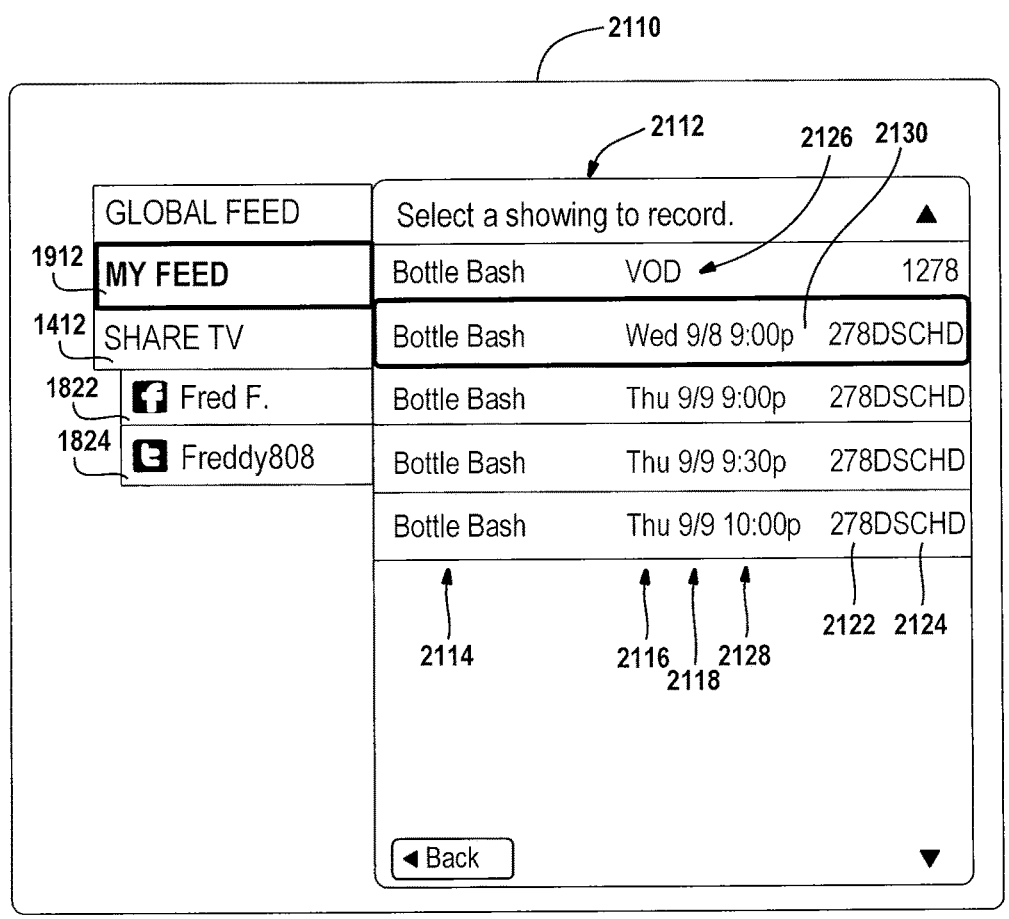
FIG. 21 is a screen display for a set top box describing a plurality of potential recording events.

Referring now to FIG. 21, a screen display corresponding to the "my feed button" 1912 is illustrated showing a recording selection interface 2112. In this example, the episode title 2114, the day 2116, the date 2118, the time 2120, the channel 2122, and the channel descriptor 2124 are provided for each version of the episode. Also, a video-on-demand indicator 2126 corresponds to the episode being available as a video-on-demand content at channel 1278.

A selected area 2130 may be used for selecting the desired instance of the episode for recording. The selection may be formed using various selection buttons.

Figure 22:
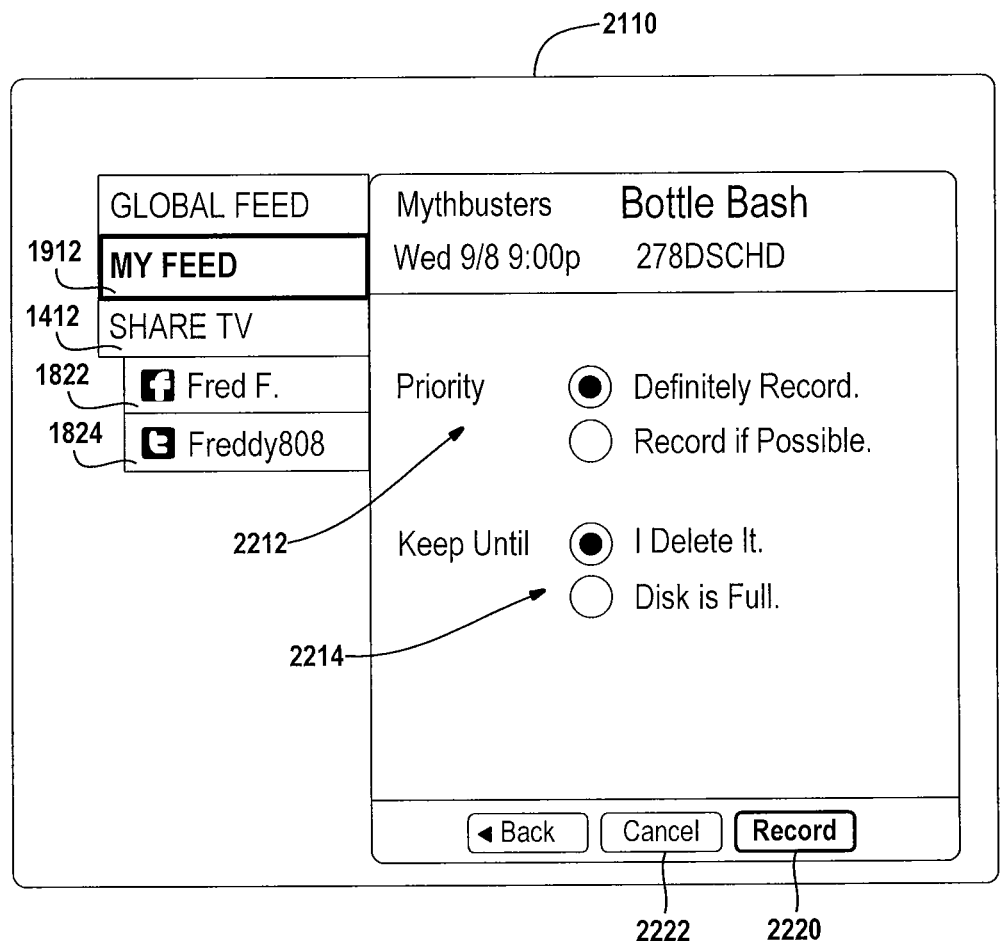
FIG. 22 is a screen display for a set top box illustrating priority and storage options.

Referring now to FIG. 22, a screen display 2210 is illustrated after selecting an episode from FIG. 21. In this example, a priority selector 2212 and a keep until selector 2214 may be selected. The priority selector 2212 may provide a "definitely record" option and a "record if possible" option for selection by the user of the user device. The "keep until" selection 2214 may include a "delete it" or "disk is full" selection for determining when the content may be removed. A record button 2220 may be selected after the priority and "keep until" is selected by the user. The process may be cancelled using the cancel button 2222.

Figure 23:
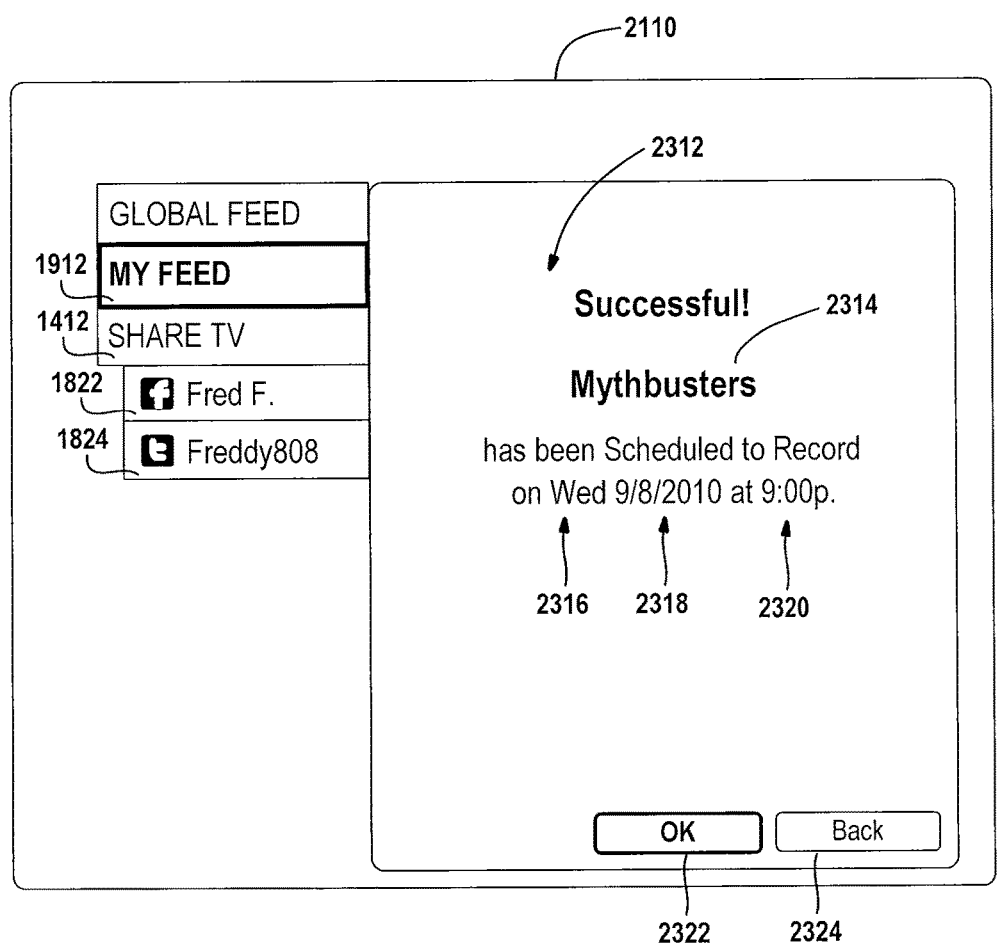
FIG. 23 is a screen display for a successful recording event.

Referring now to FIG. 23, a screen display 2310 is illustrating having a success message 2312 after the record button 2220 is selected in FIG. 22. The success message 2312 may include the program title 2314, the day 2316, the date 2318, and the time 2320 that was selected for recording. An OK button 2322 may be selected if this function is what was desired to be performed. A back button 2324 may also be used to reselect and return back to FIG. 22.

Figure 24:
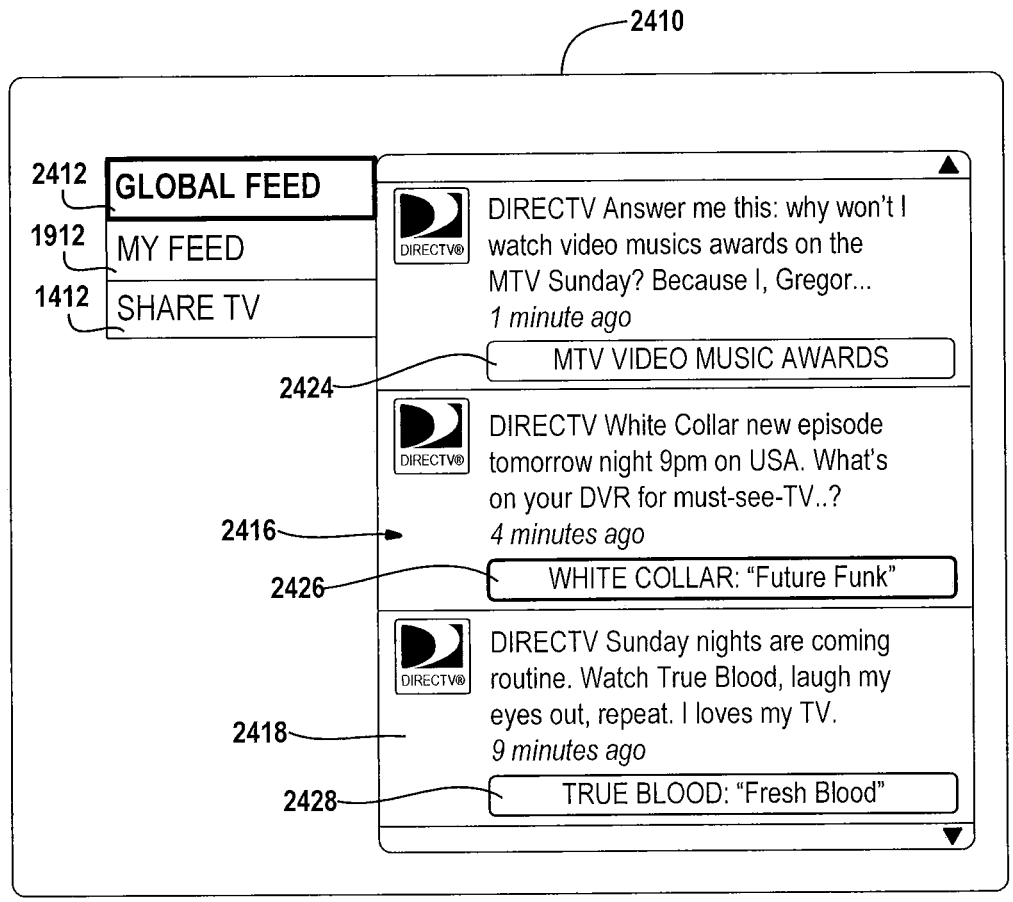
FIG. 24 is a screen display for a set top box for a global feed that may be sponsored by content or a service provider.

Referring now to FIG. 24, a screen display 2410 illustrating a global feed button 2412 selection is illustrated. In this example, feeds from various sources including internal sources from the content processing system may be generated. Various messages 2414, 2416 and 2418 may be displayed. Only a predetermined number of selections may be displayed at any one time. In this example, three messages 2414-2418 are illustrated on the screen. The global feeds 2412 may be provided generically by various content providers or the provider of the content processing system. Selection buttons 2424, 2426 and 2428 may be selected for watching, viewing, or sharing as described above.

Figure 25:
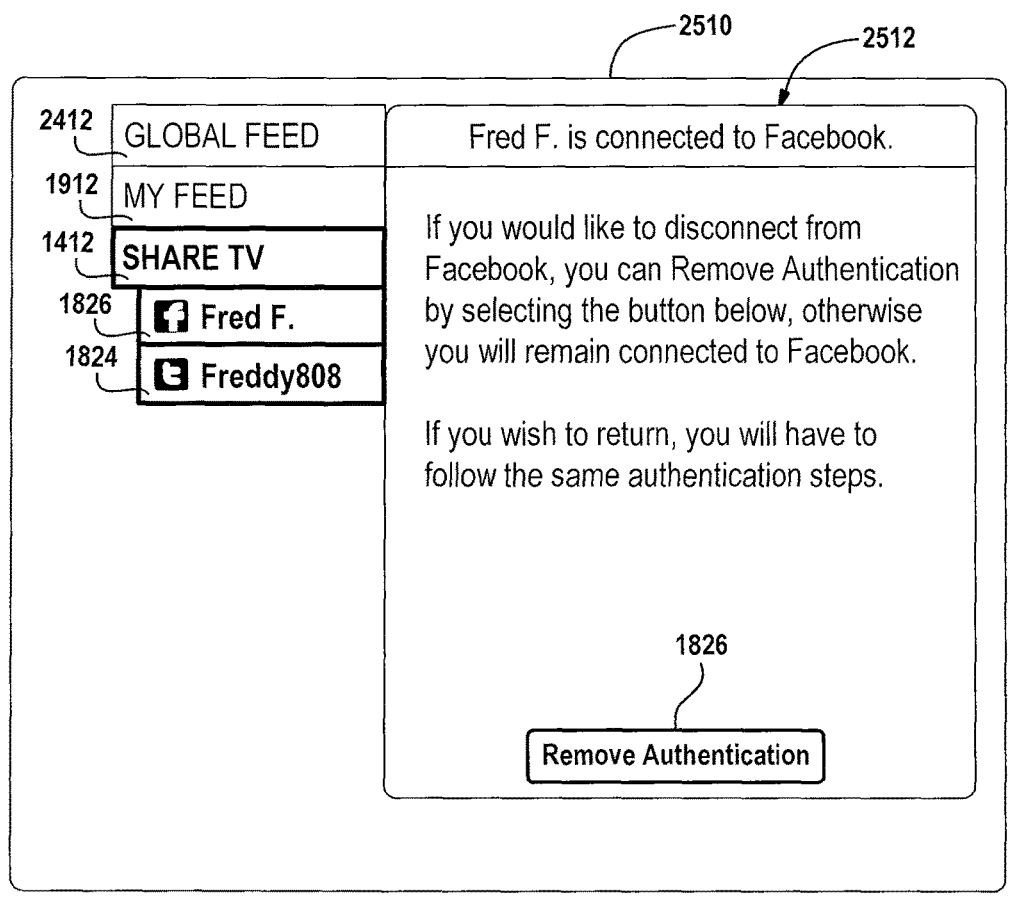
FIG. 25 is a screen display for a set top box for removing authentication for a social networking site.

Referring now to FIG. 25, a screen display 2510 for removing authentication of one of the authenticated accounts is illustrated in the display portion 2512. The display portion may allow one of the user buttons 1822, 1824 to be selected for removal of authentication. To remove authentication, the appropriate button 1822, 1824 is selected and the remove authentication button 1826 is selected for removal.

Figure 26:
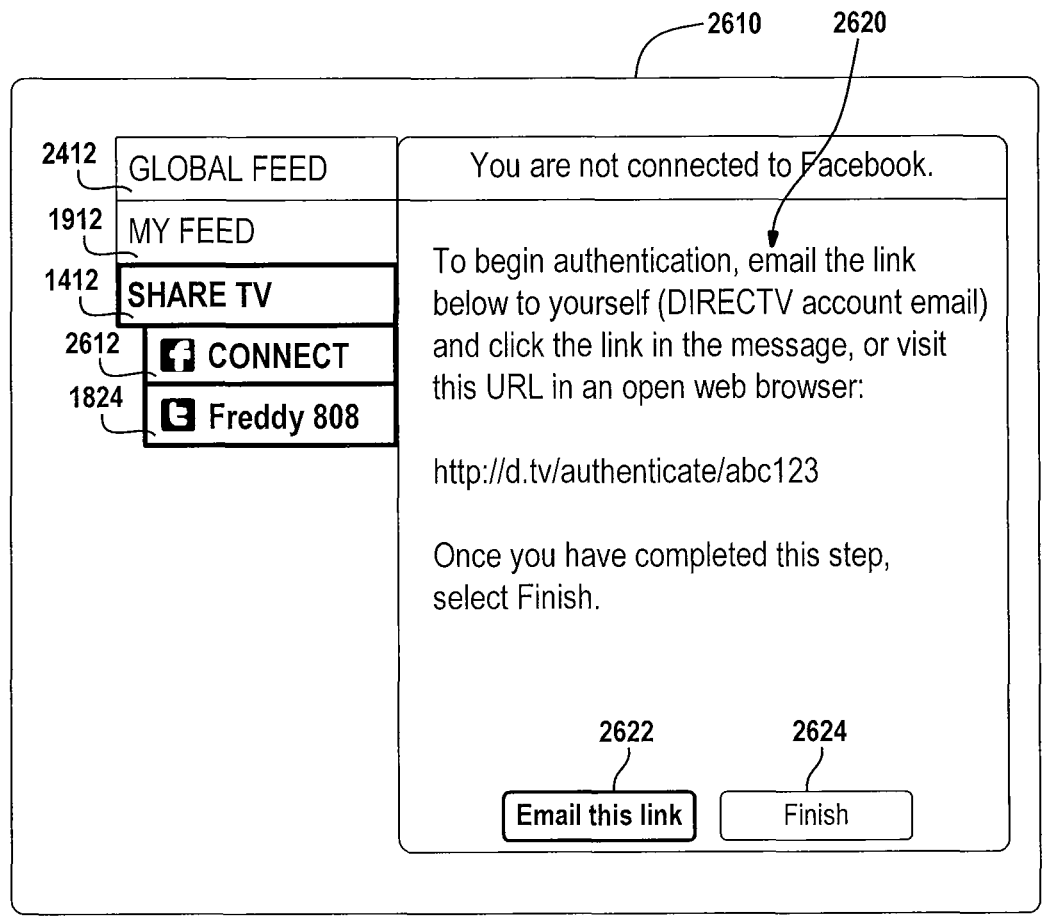
FIG. 26 is a screen display for a set top box illustrating a disconnected social networking site.

Referring now to FIG. 26, a screen display 2610 is generated after FIG. 25. The screen display 2610 illustrates a button 2612 that shows a "connect" instruction thereon. Because the previous authorization from button 1822 of FIG. 25 was removed, the "connect" button 2612 causes instructions 2620 to be generated for re-authenticating the connection. An e-mail link button 2622 and a finish button 2624 may be generated and perform a similar function as those illustrated in FIG. 14.

Figure 27:
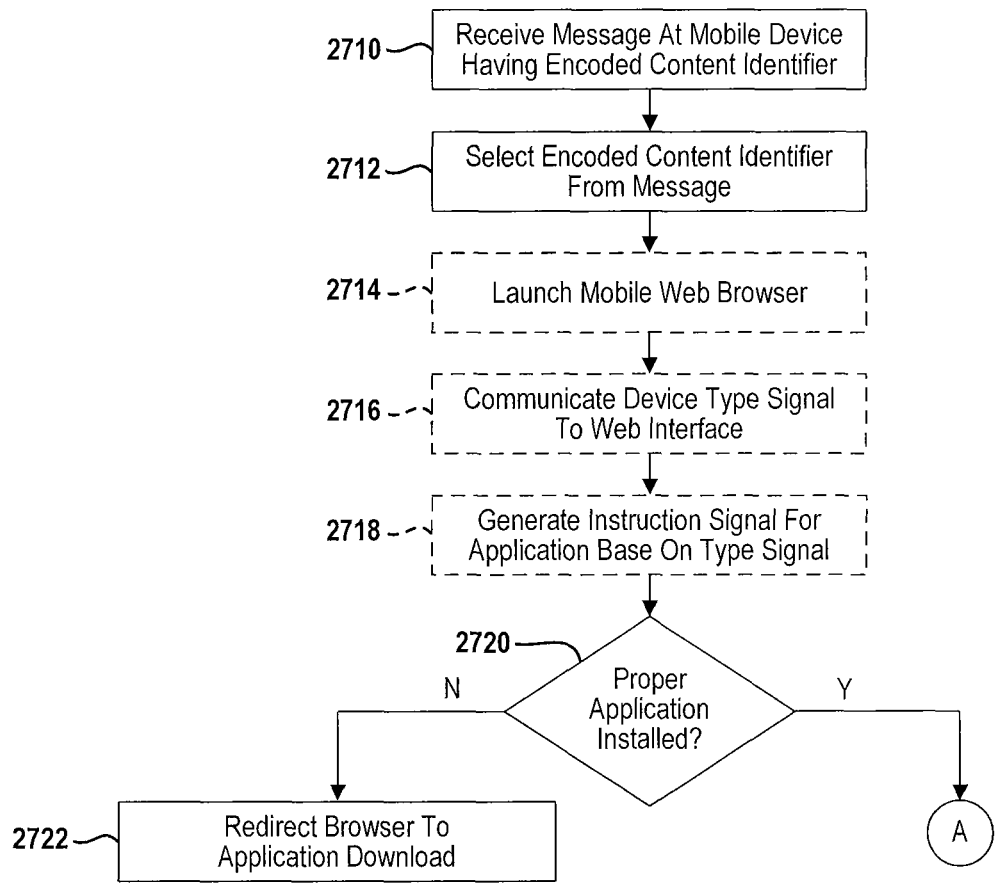
FIG. 27 is a flowchart of a method of operating a mobile receiver that receives a message with an encoded content identifier.

Referring now to FIG. 27, a method of operating a mobile device that receives messages having an encoded content identifier is set forth. In step 2710, the mobile device receives a message signal having an encoded content identifier. The message may be received in various ways including through a web browser browsing a social networking website. A text message or e-mail message may also include the encoded content identifier.

In step 2712, the encoded content identifier from the message may be selected. After step 2712, optional step 2714 may be performed. Step 2714 may launch a mobile web browser. After step 2714, optional step 2716 may then be performed. Step 2716 communicates a device-type signal to a web interface. The device type includes data corresponding to the type of device such as mobile phone, computer, or set top box. Specific types such as brand and screen size may also be included in the device type data. As mentioned above, the web interface may be part of or associated with the content processing system.

In optional step 2718, an instruction signal is generated for an application based upon the type signal. In step 2720, the mobile device determines whether a proper application is installed. If a proper application is not installed, step 2722 redirects the browser to an application download site for downloading the proper application.

Figure 28:
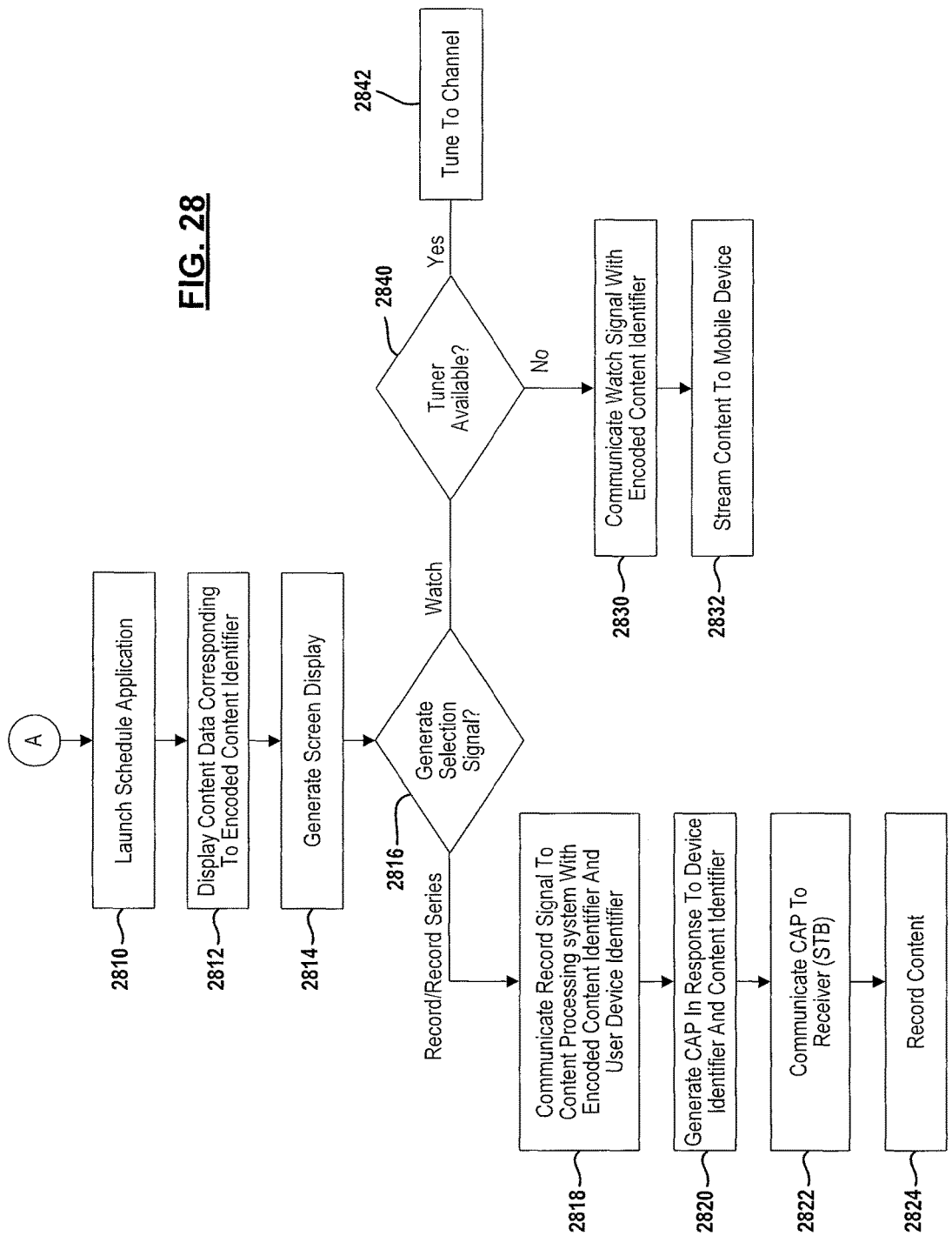
FIG. 28 is a continued flowchart from that of FIG. 27 illustrating various options after an encoded content identifier is selected.

After step 2722 and after step 2720 when a proper application is installed, the system continues in FIG. 28.

Referring now to FIG. 28, a scheduler application may be launched at the mobile device when the content identifier message is selected in step 2810. This may be performed directly after the encoded content identifier is selected from the message or after the optional steps 2714-2720.

After the scheduler application is launched, step 2812 displays the content data corresponding to the encoded content identifier. In step 2814, a screen display is generated that may have options for the particular content data. Examples of such screen displays are provided below.

In step 2816, a selection signal is generated. The selection signal may be generated by selecting one of the buttons from the screen display generated in step 2814.

Step 2818 is performed when a record selection or a record series selection is selected from the screen display. Step 2818 communicates a record signal to a content processing system with the encoded content identifier and a user device account or user device identifier. The record signal may be directly communicated to the set top box through the network or indirectly through the content processing system. Steps 2820-2822 apply to the content processing system-based method. In step 2820, the content processing system may generate a conditional access packet in response to the record signal and more specifically the device identifier and content identifier contained therein. The conditional access packet signal provides instructions for the user device so that recording may automatically be initiated at the user device.

In step 2822, the conditional access packet (CAP) is communicated to the receiver. The conditional access packet may be communicated through a network such as the satellite network or a terrestrial network. In step 2824, the user device records the content in response to the CAP or direct record signal.

Referring back to step 2816, the selection signal may correspond to a "watch" signal that, when selected, allows the user device to directly receive content. In step 2830, the watch signal is communicated with the encoded content identifier to the content processing system or to the set top box through the network. In step 2832, the content may be streamed to the mobile device from the content processing system or set top box. The mobile device may receive streaming content from the satellite, network or through a terrestrial network.

When "watch" is selected in step 2816, the device may also be tuned to the proper channel if tuners are included therein. Step 2840 determines if a tuner is available. Step 2842 tunes the tuner to the proper channel.

Figure 29:
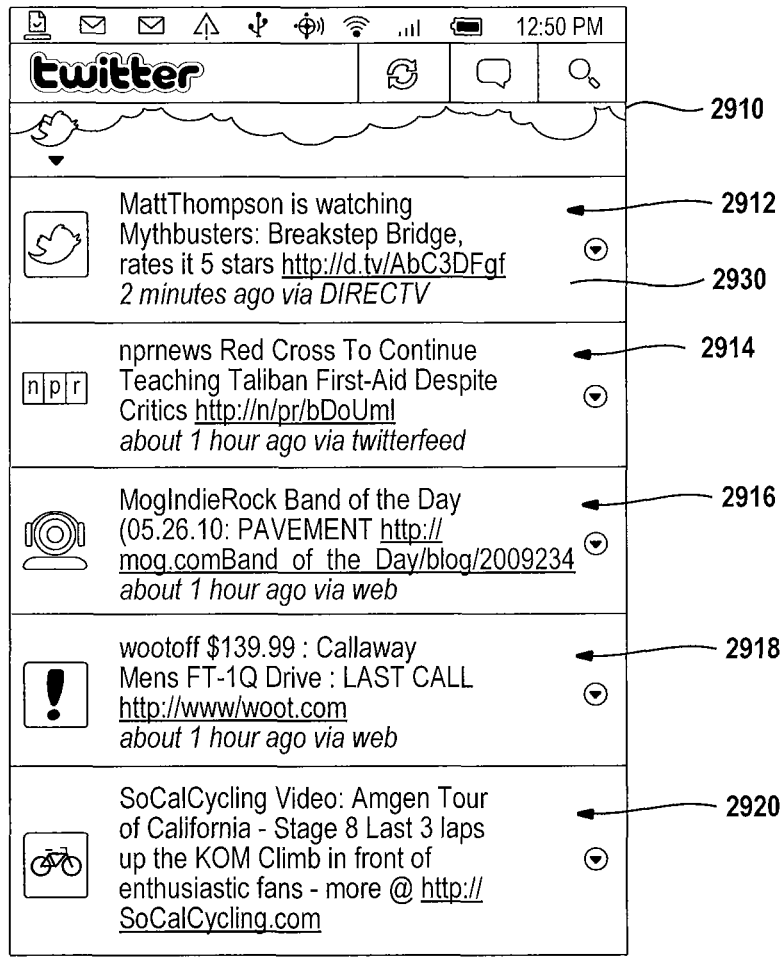
FIG. 29 is a screen display for a mobile device having various messages in a social networking site that include links or encoded content identifiers therein.

Referring now to FIG. 29, a screen display 2910 of a mobile device is illustrated with a social networking website displaying a plurality of messages 2912, 2914, 2916, 2918, and 2920. The first message 2912 includes an encoded content identifier 2930. By selecting the encoded content identifier 2930, the process described in FIGS. 27 and 28 may be initiated.

Figure 30:
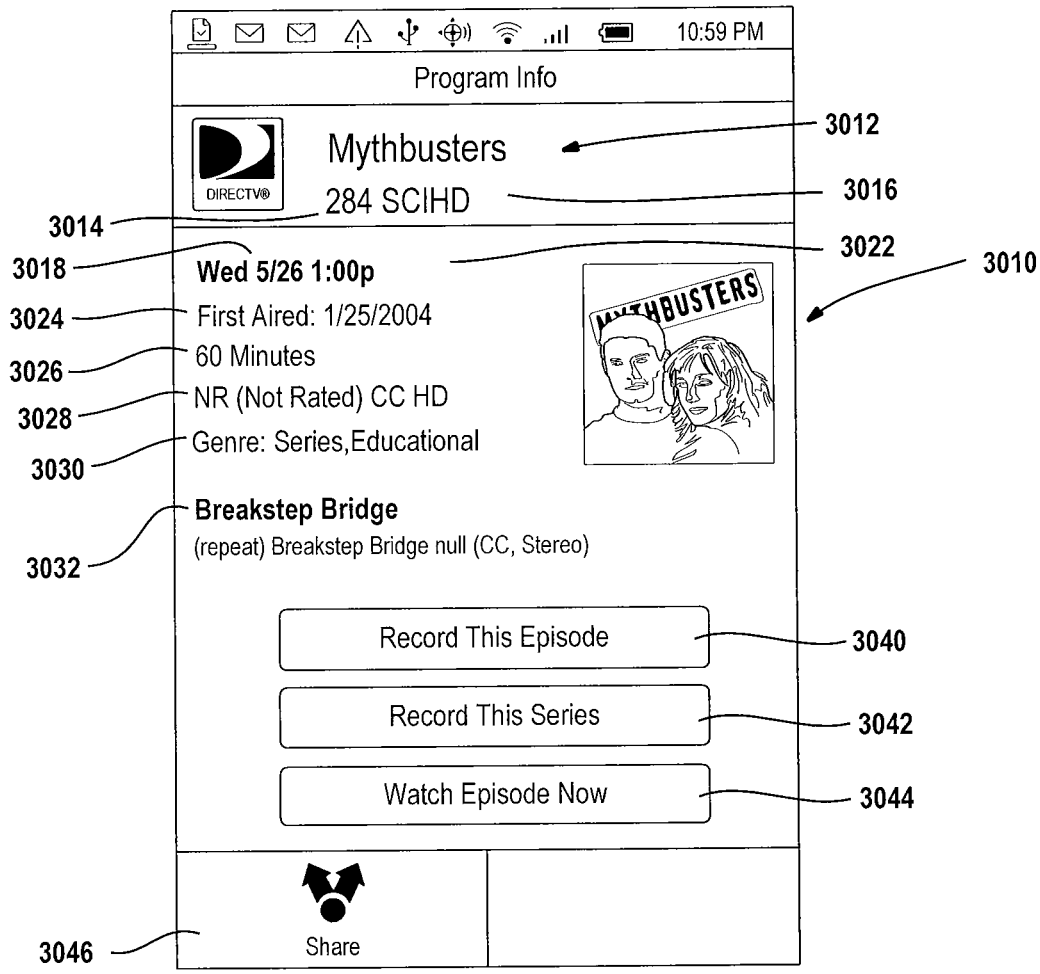
FIG. 30 is a screen display of a mobile device having various content data and options for recording, watching, or sharing the content.

Referring now to FIG. 30, a screen display 3010 is illustrated. The screen display 3010 provides various data regarding the selected content. The data is retrieved in response to the encoded content identifier from the first message 2912 illustrated in FIG. 29. In this example, a content title 3012, a channel 3014, and a channel descriptor 3016 are provided. As well, the day 3018, the date 3020, and the time 3022 are also provided. A first aired date 3024, a time 3026, a rating 3028, and a genre 3030 may also be provided. An episode title 3032 may also be provided.

Various option buttons may also be provided. A record this episode button 3040 may be provided. The record this episode button may be selected for recording the episode whose information is displayed upon the screen display 3010. A record this series button 3042 may also be provided for recording the entire series corresponding to the title 3012. By selecting either of the recording options, the encoded content identifier may be communicated to the content processing system and the recording process of steps 3818-3824 described above in FIG. 28 may be performed.

A watch button such as a "watch this episode now" button 3044 may also be provided. The watch this episode now button 3044 may perform steps 3830-3832 described in FIG. 28. That is, the encoded content identifier may be communicated to the content processing system and the episode may be streamed directly to the mobile device displayed.

A share option 3046 may also be provided. The share button 3046 may allow various choices and messages to be generated that include the encoded content identifier. The share process may be similar to the share process described above with respect to the receiver or set top box in which a particular social networking site may be selected or an e-mail or text message may also be selected to include the encoded content identifier.

Figure 31:
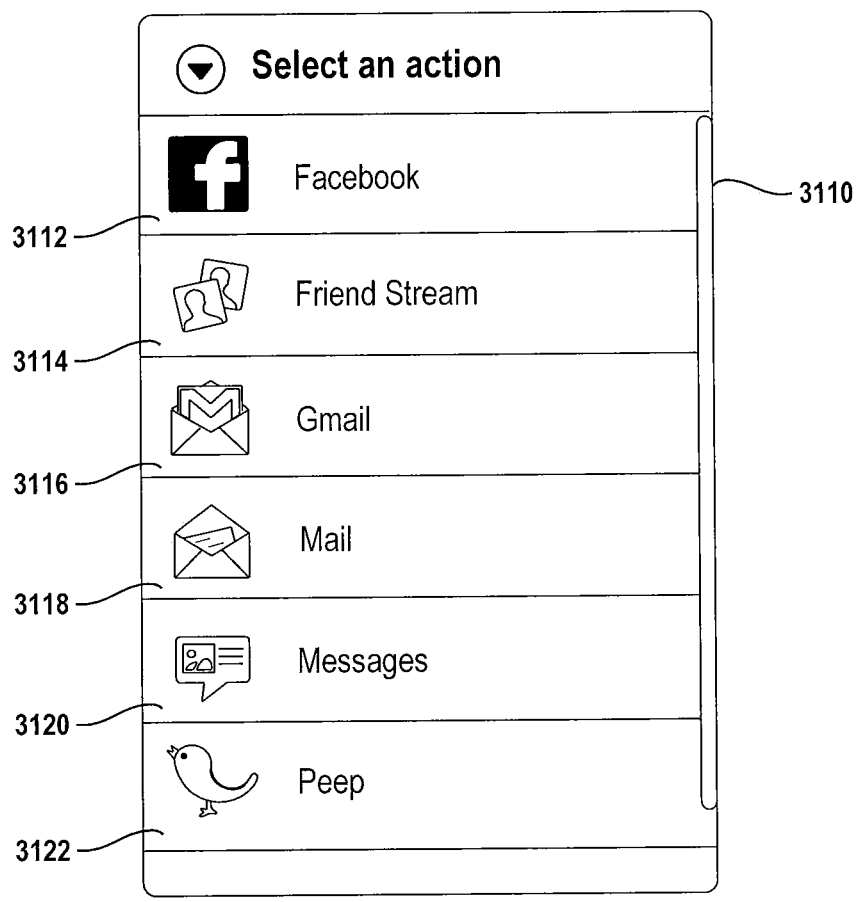
FIG. 31 is a screen display that may be generated after selecting the share button in FIG. 30 for sharing the encoded content identifier.

Referring now to FIG. 31, after selecting the share button 3046 a screen display 3110 is illustrated. The screen display 3110 illustrates a plurality of options for sharing the encoded content link. In this example, the first option 3112 corresponds to Facebook®. The second option 3114 corresponds to Friend Stream®, another social networking site that combines Facebook® and Twitter® messages. Another option 3116 is for Google® mailing the encoded content identifier. Selection 3118 may be used for e-mailing the message. Messages selection 3120 may be used for SMS text messaging the message. Selection 3122 may use the program Peep®, which is a Twitter® client for e-mailing the message. Of course, other selection types may be performed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   generating an encoded content identifier for video content by encoding a content identifier;
   communicating the encoded content identifier to a first device and a second device through a network;
   selecting the encoded content identifier at the first device using a first user interface of the first device;
   selecting the encoded content identifier at the second device using a second user interface of the second device;
   in response to a first type of the first device, the encoded content identifier and selecting the encoded content identifier at the first device, performing a first function at the first device, said first function comprising one of tuning a tuner of the first device to television content, initiating a recording application, generating an outgoing message content identifier with a third device, and recording the content corresponding to the television content; and
   in response to a second type of the second device, the encoded content identifier and selecting the encoded content identifier at the second device, performing a second function different than the first function at the second device, said second function comprising one of tuning a tuner of the second device to the television content, initiating a recording application, generating an outgoing message content identifier with the third device, and recording the content corresponding to the television content.

2. A method as recited in claim 1 wherein generating an encoded content identifier comprises generating the encoded content identifier in a content processing system.

3. A method as recited in claim 2 wherein generating an encoded content identifier comprises generating an encoded content identifier link corresponding to a unique content or content attribute provided from the content processing system.

4. A method as recited in claim 1 wherein generating an encoded content identifier comprises generating the encoded content identifier for a portion of a content in a content processing system.

5. A method as recited in claim 1 wherein generating an encoded content identifier comprises generating the encoded content identifier and a content format identifier.

6. A method as recited in claim 1 wherein generating an encoded content identifier comprises generating the encoded content identifier for television content available from a content processing system.

7. A method as recited in claim 1 wherein generating an encoded content identifier comprises generating the encoded content identifier, a channel identifier, a date identifier and a time identifier.

8. A method as recited in claim 1 wherein generating an encoded content identifier comprises generating at least one of a channel link, an actor link or a category link.

9. A method as recited in claim 1 wherein communicating the encoded content identifier to a first device through a network comprises communicating the encoded content identifier to the first device comprising a set top box.

10. A method as recited in claim 9 wherein performing a first function comprises sharing the encoded content identifier.

11. A method as recited in claim 10 wherein sharing comprises generating an outgoing message comprising an electronic mail.

12. A method as recited in claim 10 wherein sharing comprises generating an outgoing message comprising a social networking message.

13. A method as recited in claim 10 wherein sharing comprises generating an outgoing message comprising a social networking message having a comment or rating.

14. A method as recited in claim 10 wherein sharing comprises generating an outgoing message comprising a text message.

15. A method as recited in claim 10 wherein performing a first function comprises tuning to content corresponding to the encoded content identifier.

16. A method as recited in claim 15 wherein performing a first function comprises recording the content corresponding to the encoded content identifier.

17. A method as recited in claim 9 wherein prior to communicating, authenticating the set top box with an external website and further comprising receiving the encoded content identifier through the external website.

18. A method as recited in claim 9 wherein communicating the encoded content identifier to a first device through a network comprises communicating the encoded content identifier in a message from a social networking site to the set top box.

19. A method as recited in claim 9 wherein communicating the encoded content identifier to a first device through a network comprises communicating the encoded content identifier in an electronic mail message to the set top box.

20. A method as recited in claim 9 wherein communicating the encoded content identifier to a first device through a network comprises communicating the encoded content identifier in a text message to the set top box.

21. A method as recited in claim 1 wherein communicating the encoded content identifier to a first device through a network comprises communicating the encoded content identifier to the first device comprising a mobile device.

22. A method as recited in claim 21 wherein performing a second function comprises sharing the encoded content identifier.

23. A method as recited in claim 22 wherein sharing comprises generating an outgoing message comprising an electronic mail.

24. A method as recited in claim 22 wherein sharing comprises generating an outgoing message comprising a social networking message.

25. A method as recited in claim 22 wherein sharing comprises generating an outgoing message comprising a social networking message having a comment or rating.

26. A method as recited in claim 22 wherein sharing comprises generating an outgoing message comprising a text message.

27. A method as recited in claim 21 wherein performing a second function comprises communicating the encoded content identifier to the content processing system and streaming content corresponding to the encoded content identifier to the mobile device.

28. A method as recited in claim 21 wherein performing a second function comprises initiating a recording application the first device in response to the encoded content identifier.

29. A method as recited in claim 21 wherein communicating the encoded content identifier to a first device through a network comprises communicating the encoded content identifier in a message from a social networking site to the mobile device.

30. A method as recited in claim 21 wherein communicating the encoded content identifier to a first device through a network comprises communicating the encoded content identifier in an electronic mail message to the mobile device.

31. A method as recited in claim 21 wherein communicating the encoded content identifier to a first device through a network comprises communicating the encoded content identifier in a text message to the mobile device.

32. A method as recited in claim 1 wherein communicating the encoded content identifier to a first device through a network comprises communicating the encoded content identifier to the first device comprising a personal computer.

33. A method as recited in claim 32 wherein performing a first function comprises sharing the encoded content identifier.

34. A method as recited in claim 33 wherein sharing comprises generating an outgoing message comprising an electronic mail.

35. A method as recited in claim 33 wherein sharing comprises generating an outgoing message comprising a social networking message.

36. A method as recited in claim 33 wherein sharing comprises generating an outgoing message comprising a social networking message having a rating.

37. A method as recited in claim 32 wherein performing a first function comprises communicating the encoded content identifier to a content processing system and streaming content corresponding to the encoded content identifier to the personal computer.

38. A method as recited in claim 32 wherein performing a first function comprises initiating recording in response to the encoded content identifier.

39. A method as recited in claim 32 wherein communicating the encoded content identifier to a first device through a network comprises communicating the encoded content identifier in a message from a social networking site to the personal computer.

40. A method as recited in claim 32 wherein communicating the encoded content identifier to a first device through a network comprises communicating the encoded content identifier in an electronic mail message to the personal computer.

41. A system comprising:
a first device;
a second device;
an encoded content identifier module in communication with the first device and the second device generating an encoded content identifier for video content formed by encoding a content identifier and communicating the encoded content identifier to the first device and the second device through a network; and
said first device comprising a first user interface for selecting the encoded content identifier;
said second device comprising a second user interface for selecting the encoded content identifier;
wherein said first device performs a first function in response to a first type of the first device, the encoded content identifier and selecting the encoded content identifier and wherein said second device performs a second function different than the first function in response to a second type of the second device, the encoded content identifier and selecting the encoded content identifier, said first function comprising one of tuning a tuner of the first device to television content, initiating a recording application, generating an outgoing message content identifier with a third device, and recording the content corresponding to the television program content, said second function comprising one of tuning a tuner of the second device to television content, initiating a recording application, generating an outgoing message content identifier with a third device, and recording the content corresponding to television content.

42. A system as recited in claim 41 further comprising a content processing system generating the encoded content identifier.

43. A system as recited in claim 42 wherein the encoded content identifier comprises an encoded content identifier link corresponding to a unique content or content attribute provided from the content processing system.

44. A system as recited in claim 42 wherein the encoded content identifier corresponds to a portion of content in the content processing system.

45. A system as recited in claim 41 wherein the encoded content identifier comprises the encoded content identifier and a content identifier format identifier.

46. A system as recited in claim 41 wherein the encoded content identifier corresponds to television content available from a content processing system.

47. A system as recited in claim 46 wherein generating an encoded content identifier comprises generating the encoded content identifier and a channel identifier, a date identifier and a time identifier.

48. A system as recited in claim 41 wherein the encoded content identifier comprises a channel link, an actor link or a category link.

49. A system as recited in claim 41 wherein the first device comprises a set top box.

50. A system as recited in claim 49 wherein the first function comprises sharing the encoded content identifier in a message.

51. A system as recited in claim 50 wherein the message comprises an electronic mail.

52. A system as recited in claim 50 wherein the message comprises a social networking message.

53. A system as recited in claim 50 wherein the message comprises an outgoing message comprising a social networking message having a comment or rating.

54. A system as recited in claim 50 wherein the message comprises a text message.

55. A system as recited in claim 41 wherein the first function comprises tuning to content corresponding to the encoded content identifier.

56. A system as recited in claim 41 wherein the first function comprises recording the content corresponding to the encoded content identifier.

57. A system as recited in claim 49 further comprising a social networking site communicating the encoded content identifier in a message to the set top box.

58. A system as recited in claim 49 further comprising the second device communicating the encoded content identifier in an electronic mail message to the set top box.

59. A system as recited in claim 49 further comprising the second device communicating the encoded content identifier in a text message to the set top box.

60. A system as recited in claim 41 wherein the first device comprises a mobile device.

61. A system as recited in claim 60 wherein the first function comprises sharing the encoded content identifier in a message.

62. A system as recited in claim 61 wherein the message comprises an electronic mail.

63. A system as recited in claim 61 wherein the message comprises a social networking message.

64. A system as recited in claim 61 wherein the message comprises a social networking message having a comment or rating.

65. A system as recited in claim 61 wherein the message comprises a text message.

66. A system as recited in claim 60 further comprising a content processing system;
    said first device communicating the encoded content identifier to the content processing system; and
    said content processing system streaming content corresponding to the encoded content identifier to the mobile device.

67. A system as recited in claim 60 wherein the first function comprises initiating a recording application the first device.

68. A system as recited in claim 60 further comprising a social networking site communicating the encoded content identifier in a message to the mobile device.

69. A system as recited in claim 60 further comprising the second device communicating the encoded content identifier in an electronic mail message to the mobile device.

70. A system as recited in claim 60 further comprising the second device communicating the encoded content identifier in a text message to the mobile device.

71. A system as recited in claim 41 wherein the first device comprises a personal computer.

72. A system as recited in claim 71 wherein the second function comprises sharing the encoded content identifier in a message.

73. A system as recited in claim 72 wherein the message comprises an electronic mail.

74. A system as recited in claim 72 wherein the message comprises an outgoing message comprising a social networking message.

75. A system as recited in claim 72 wherein the message comprises an outgoing message a social networking message having a comment or rating.

76. A system as recited in claim 71 wherein the first device communicates the encoded content identifier to a content processing system and said content processing system streams content corresponding to the encoded content identifier to the personal computer.

77. A system as recited in claim 71 wherein performing a second function comprises initiating recording in response to the encoded content identifier.

78. A system as recited in claim 71 further comprising a social networking website communicating the encoded content identifier in a message to the personal computer.

79. A system as recited in claim 71 further comprising the second device communicating the encoded content identifier in an electronic mail message to the personal computer.

* * * * *